US012130383B2

(12) United States Patent
Gassend et al.

(10) Patent No.: US 12,130,383 B2
(45) Date of Patent: Oct. 29, 2024

(54) ROTATABLE MIRROR DEVICE

(71) Applicant: Waymo LLC, Mountain View, CA (US)

(72) Inventors: Blaise Gassend, East Palo Alto, CA (US); David Duff, Portola Valley, CA (US); Paul Karplus, Redwood City, CA (US); Hui Son, Hayward, CA (US); Alex Rivas, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 962 days.

(21) Appl. No.: 17/134,272

(22) Filed: Dec. 26, 2020

(65) Prior Publication Data

US 2021/0199779 A1   Jul. 1, 2021

Related U.S. Application Data

(60) Provisional application No. 62/954,108, filed on Dec. 27, 2019.

(51) Int. Cl.
| | | |
|---|---|---|
| *G01S 7/48* | (2006.01) | |
| *G01D 5/14* | (2006.01) | |
| *G01S 7/481* | (2006.01) | |
| *G01S 17/08* | (2006.01) | |

(52) U.S. Cl.
CPC .............. *G01S 7/4817* (2013.01); *G01D 5/14* (2013.01); *G01S 17/08* (2013.01)

(58) Field of Classification Search
None
See application file for complete search history.

(56) References Cited

U.S. PATENT DOCUMENTS

| | | |
|---|---|---|
| 9,618,742 B1 | 4/2017 | Droz et al. |
| 9,625,582 B2 | 4/2017 | Gruver et al. |

(Continued)

FOREIGN PATENT DOCUMENTS

| | | |
|---|---|---|
| KR | 20180003234 A | 1/2018 |
| KR | 101947721 B1 | 2/2019 |

(Continued)

OTHER PUBLICATIONS

International Searching Authority, International Search Report and Written Opinion mailed on Apr. 22, 2021, issued in connection with International Patent Application No. PCT/US202/067056, filed on Dec. 26, 2020, 11 pages.

(Continued)

*Primary Examiner* — Hovhannes Baghdasaryan
(74) *Attorney, Agent, or Firm* — McDonnell Boehnen Hulbert & Berghoff LLP

(57) ABSTRACT

The present disclosure relates to systems and devices having a rotatable mirror assembly. An example system includes a housing and a rotatable mirror assembly. The rotatable mirror assembly includes a plurality of reflective surfaces, a shaft defining a rotational axis, and a mirror body coupling the plurality of reflective surfaces to the shaft. The mirror body includes a plurality of flexible support members. The rotatable mirror assembly also includes a coupling bracket configured to removably couple the rotatable mirror assembly to the housing. The system also includes a transmitter configured to emit emission light into an environment of the system after interacting with at least one reflective surface of the plurality of reflective surfaces. The system additionally includes a receiver configured to detect return light from the environment after interacting with the at least one reflective surface of the plurality of reflective surfaces.

20 Claims, 23 Drawing Sheets

(56) References Cited

U.S. PATENT DOCUMENTS

| | | |
|---|---|---|
| 9,910,155 B2 | 3/2018 | Lundquist et al. |
| 10,001,551 B1 | 6/2018 | Gassend et al. |
| 10,267,908 B2 | 4/2019 | Luders et al. |
| 10,324,170 B1 | 6/2019 | Enberg, Jr. et al. |
| 10,379,540 B2 | 8/2019 | Droz et al. |
| 10,429,495 B1 | 10/2019 | Wang et al. |
| 2018/0109061 A1* | 4/2018 | Pardhan ............... H05K 7/2039 |
| 2018/0136321 A1 | 5/2018 | Verghese et al. |
| 2019/0011544 A1 | 1/2019 | Gassend et al. |
| 2019/0101671 A1 | 4/2019 | Miner et al. |
| 2019/0146070 A1 | 5/2019 | Hansson |
| 2019/0154808 A1 | 5/2019 | Gassend et al. |
| 2019/0154816 A1 | 5/2019 | Hughes et al. |
| 2019/0310351 A1* | 10/2019 | Hughes ............... G02B 26/101 |

FOREIGN PATENT DOCUMENTS

| | | |
|---|---|---|
| KR | 20190066349 A | 6/2019 |
| KR | 20190106216 A | 9/2019 |
| WO | 2019/025222 | 2/2019 |
| WO | 2019/064062 | 4/2019 |
| WO | 2019/113368 | 6/2019 |
| WO | 2019/135494 | 7/2019 |

OTHER PUBLICATIONS

Wallace, John, "Photonics Products: Laser Scanning: Polygon beam scanners enable essential applications," https://www.laserfocusworld.com/optics/article/16548158/photonics-products-laser-scanning-polygon-beam-scanners-enable-essential-applications, Sep. 13, 2017, 21 pages (as-is).

\* cited by examiner

ROTATABLE MIRROR DEVICE

CROSS-REFERENCE TO RELATED APPLICATION

The present application claims the benefit of U.S. Patent Application No. 62/954,108, filed Dec. 27, 2019, the content of which is herewith incorporated by reference.

BACKGROUND

A conventional Light Detection and Ranging (lidar) system may utilize a light-emitting transmitter (e.g., a laser diode) to emit light pulses into an environment. Emitted light pulses that interact with (e.g., reflect from) objects in the environment can be received by a receiver (e.g., a photodetector) of the lidar system. Range information about the objects in the environment can be determined based on a time difference between an initial time when a light pulse is emitted and a subsequent time when the reflected light pulse is received.

SUMMARY

The present disclosure generally relates to light detection and ranging (lidar) systems, which may be configured to obtain information about an environment. Such lidar devices may be implemented in vehicles, such as autonomous and semi-autonomous automobiles, trucks, motorcycles, and other types of vehicles that can navigate and move within their respective environments.

In a first aspect, a light detection and ranging (lidar) device is provided. The lidar device includes a housing and a mirror assembly disposed within the housing. The mirror assembly includes a shaft. The shaft has a first end and a second end opposite the first end. The shaft defines a rotational axis of the mirror assembly. The mirror assembly also includes a bearing, having an inner race and an outer race. The inner race is coupled to the shaft proximate the first end. The mirror assembly additionally includes at least one magnet disposed proximate to the second end of the shaft. The mirror assembly yet further includes a plurality of reflective surfaces arranged about the rotational axis. Each reflective surface is defined by a reflective material. The lidar device also includes a motor having a stator configured to interact with the at least one magnet to rotate the mirror assembly about the rotational axis. The lidar device also includes a transmitter configured to emit emission light into an environment of the lidar device via the mirror assembly and a receiver configured to detect return light that is received from the environment via the mirror assembly.

In a second aspect, a system is provided. The system includes a housing and a rotatable mirror assembly. The rotatable mirror assembly includes a plurality of reflective surfaces and a shaft defining a rotational axis. The rotatable mirror assembly also includes a mirror body coupling the plurality of reflective surfaces to the shaft. The mirror body includes a plurality of flexible support members. The rotatable mirror assembly also includes a coupling bracket configured to removably couple the rotatable mirror assembly to the housing. The system includes a transmitter configured to emit emission light into an environment of the system after interacting with at least one reflective surface of the plurality of reflective surfaces. The system also includes a receiver configured to detect return light from the environment after interacting with the at least one reflective surface of the plurality of reflective surfaces.

In a third aspect, a rotatable mirror assembly is provided. The rotatable mirror assembly includes a plurality of reflective surfaces, a shaft defining a rotational axis, and a mirror body coupling the plurality of reflective surfaces to the shaft. The mirror body includes a plurality of flexible support members. The rotatable mirror assembly also includes a coupling bracket configured to removably couple the rotatable mirror assembly to an optical system.

Other aspects, embodiments, and implementations will become apparent to those of ordinary skill in the art by reading the following detailed description, with reference where appropriate to the accompanying drawings.

DETAILED DESCRIPTION

Figure 1:
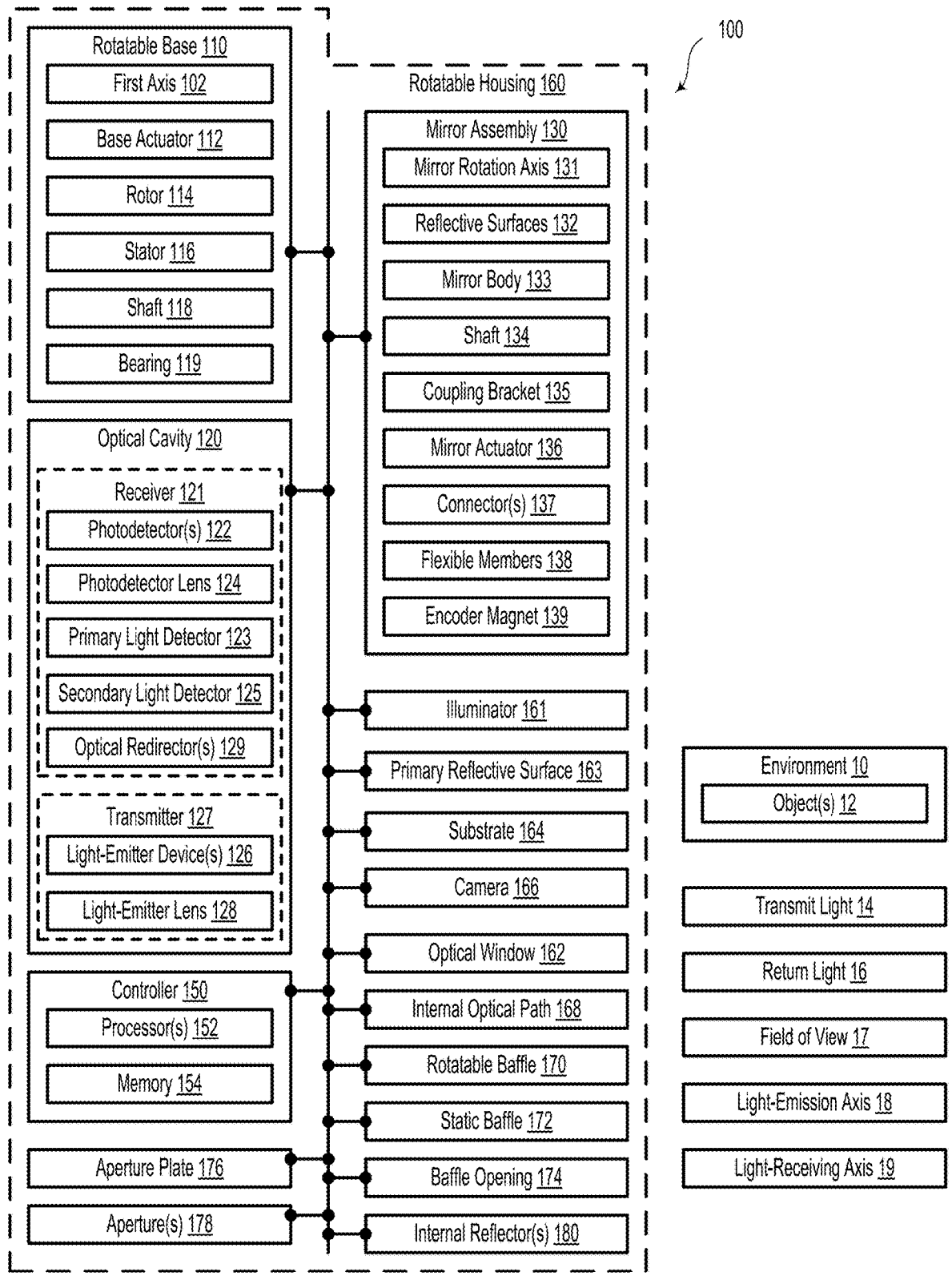
FIG. 1 illustrates a system, according to an example embodiment.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A lidar system includes a transmitter and a receiver. The transmitter may include one or more light-emitter devices (e.g., one or more laser bars with one to eight laser diodes each) configured to transmit light into an environment of the lidar system via one or more optical elements in a transmit path (e.g., a transmit lens, a rotatable mirror, and an optical window).

The rotatable mirror could be configured to rotate about a mirror rotation axis. The rotatable mirror could be configured to interact with light pulses emitted by the one or more light-emitter devices so as to direct the light pulses toward various locations within an environment. Furthermore, the rotatable mirror may be configured to direct light pulses toward the receiver after such light pulses have interacted with the environment to form return light pulses.

In an example embodiment, the mirror rotation axis could be substantially perpendicular to the emission axis of one or more of the light-emitter devices. As described, substantially perpendicular could include an angle between the mirror rotation axis and the emission axis of one or more light-emitter devices being approximately 10 degrees, 1 degree, 0.1 degree, or less. In some embodiments, the emission axis of the one or more light-emitter devices could be positioned so as to not intersect the mirror rotation axis. At least a portion of the lidar system could be configured to rotate about a first axis at an azimuthal rotational rate (e.g., 3 Hz-60 Hz).

In some examples, the first axis could be perpendicular to the mirror rotation axis. In such scenarios, at least the optical window and the rotatable mirror could be rotated about the first axis so as to scan an emitted light beam through an azimuthal angle range associated with the lidar system. As the rotatable mirror rotates about the mirror rotation axis, the emitted light beam may be scanned through varying elevation angles with respect to the lidar system.

In other words, while rotating about the rotational axis, the rotatable mirror may be configured to direct the light from the laser light source(s) into an environment of the lidar system over a wide field of view in both azimuthal angle range and elevation angle range. By directing the light over this large angular field of view, the lidar system may provide ranging information about objects within a large three-dimensional volume.

In some embodiments, the lidar system could be configured to provide information about a field of view that may extend more than 180 degrees (e.g., 210 degrees or 360 degrees) in azimuth and more than 90 degrees (e.g., 95 degrees, 110 degrees, 120 degrees, 150 degrees, or more) in elevation angle range around the system. Other sizes and shapes of various fields of view are possible and contemplated. In some examples, based on utilizing multiple light-emitter devices, the lidar system could provide an azimuthal angle resolution or elevation angle resolution of less than one degree (e.g., 0.2 degrees-0.6 degrees between beams in azimuth or in elevation, or less).

In some embodiments, the rotatable mirror may include a three or four-sided mirror surface that is coupled to a shaft. Rotatable mirrors with more or fewer sides are possible and contemplated. The shaft could be made of steel and may be configured to rotate such that the four-sided mirror surface can rotate about the shaft's axis. In some embodiments, the mirror could include an injection-molded plastic (e.g., polycarbonate) body. In such scenarios, the four-sided mirror surface could include one or more deposited materials, such as gold, silicon oxide, titanium oxide, titanium, platinum, or aluminum. In various embodiments, the rotatable mirror could be formed from an optically opaque material so as to avoid stray light from propagating from uncoated surfaces of the rotatable mirror (e.g., sides and/or inside regions).

Deformations in a surface of the mirror are undesirable because light pulses could be diverted to irregular and/or unknown positions within the environment. Furthermore, mismatches in the coefficient of thermal expansion (CTE) between the mirror body (e.g., plastic) and the shaft (e.g., steel) could introduce undesirable temperature-dependent deformations that could change dynamically.

In some embodiments, the body of the mirror could be substantially hollow so as to reduce deformation issues related to the CTE mismatch between the shaft and the mirror. For example, the four-sided mirror surface could be coupled to the shaft via a plurality of flexible members (e.g., four members extending toward a shaft from each apex of the four-sided mirror surface. The flexible members could be straight or curved. In some embodiments, the flexible members could be substantially stiff when in torsion, but elastic along the radial axis. In some embodiments, at least a portion of the shaft could have an octagonal cross-section or another type of symmetric cross-section (e.g., square or hexagonal cross-section, etc.). In various examples, the cross-section of the shaft could be shaped or otherwise configured to prevent slipping of the multi-sided rotatable mirror with respect to the shaft.

In some embodiments, the rotatable mirror may be configured to be easily replaceable and/or serviceable. For example, the rotatable mirror may be mechanically coupled to the shaft and drive magnet. In other embodiments, the rotatable mirror may include an optical mirror baffle, which may include a flat, disk-shaped opaque material that is configured to optically-separate the transmit path and the receive path within the optical cavity of the LIDAR system. In some examples, the rotatable mirror may be coupled to a mirror bracket that may be configured to be easily removed from other elements of the LIDAR system. In such a manner, the rotatable mirror (and related components) could be easily serviced and/or replaced. In some embodiments, the rotatable mirror may require servicing due to wear and tear of various components, such as rotational bearings, shaft wear, among other possibilities.

In some embodiments, an encoder magnet may be coupled to the shaft of the rotatable mirror. In such scenarios, the encoder magnet may be configured to provide information indicative of a rotational position of the rotatable mirror. For example, the encoder magnet could be utilized to determine a "zero-angle" of the plurality of reflective surfaces of the rotatable mirror. Among other possibilities, the encoder magnet could help improve positioning accuracy and repeatability of objects sensed within the environment. In various examples, the same magnet may serve as the encoder magnet and the mirror drive motor. That is, the same magnet may be configured to sense the mirror position as well as to rotatably actuate the shaft and mirror.

In one specific implementation, the width of the optical window may be between 20 millimeters and 25 millimeters. Other sizes are possible. In some examples, the optical window may be tilted at an offset angle (e.g., 10 degrees) relative to the first axis of rotation. In some embodiments, the lidar system may be configured to control a temperature of the optical window (e.g., to de-ice and/or reduce the likelihood of water condensation, etc.). In one embodiment, the lidar system may include one or more heating elements (e.g., perimeter resistor, transparent resistive film, etc.) positioned on, near, or adjacent to the optical window. In another embodiment, the lidar system may include an air duct configured to direct air toward the rotatable mirror, and the rotatable mirror may be arranged to redirect the air toward the optical window. As an example, the redirected air could defrost or otherwise control or adjust the temperature of the optical window.

In some embodiments, the receiver could include a plurality of optical redirector elements and a corresponding plurality of light detectors (e.g., four to sixteen detectors). The light detectors are configured to detect return light via one or more optical elements in a receive path (e.g., the optical window, the rotating mirror, a receive lens, and a pinhole aperture). The return light is light that has been transmitted from the transmitter and reflected back toward the receiver by an object in the environment. The optical redirector elements could be configured to direct return light entering the receiver by way of the pinhole aperture and the receive lens to respective light detectors. In some embodiments, the optical redirector elements could optically couple portions of the return light toward each light detector using total internal reflection. In some embodiments, the optical redirector elements could be configured to separate the respective portions of return light so as to efficiently utilize as much of the return light flux as possible.

In an example embodiment, the number of light detectors could be greater than the number of light-emitter devices. As an example, the light redirector devices could be configured to spatially separate the respective portions of the return light so as to be detected by the plurality of light detectors. In some embodiments, the optical redirector elements could separate the return light into unequal portions so as to illuminate a first light detector with a first photon flux of a first portion of return light and illuminate a second light detector with a second photon flux of a second portion of return light. In such a scenario, the first photon flux could be at least an order of magnitude different from the second photon flux. Thus, the receiver may be configured to detect a greater dynamic range within a given scene than if the respective photon fluxes provided to each photodetector were similar.

In some embodiments, the optical redirector elements could include four total internal reflection optical elements configured to spatially separate light from four pinholes spaced apart by between 400-600 microns and direct the light toward the photodetectors, which may be spaced more widely than the respective pinholes (e.g., separated by 1000 microns or more). The optical redirector elements may also provide an expanded beam to more fully fill the active area of the respective detectors. In various embodiments, the optical redirector elements could be physically grouped in pairs. In such scenarios, a first pair of optical redirector elements could be configured or otherwise shaped to interlock and/or interleave with a second pair of optical redirector elements. For example, the first and second pair of optical redirector elements could be configured to slidably couple to one another, such as via a dovetail joint. As such, the respective in-coupling ends of the optical redirector elements could be more closely spaced than might be possible with conventional injection molding processes.

In some embodiments, the pinhole aperture may be a thin plate formed from stainless steel. However, other materials are possible and contemplated. The pinhole aperture plate may be around 100 microns thick. Each pinhole could be 200-300 microns in diameter and the pinhole aperture plate may include one pinhole for each light-emitter device (e.g., four light-emitter devices, four pinholes).

In some embodiments, the plurality of light detectors could be grouped into two sets. For example, the plurality of light detectors could include four primary light detectors and four secondary light detectors. In such scenarios, a first portion of the return light could be detected by the four primary light detectors. Some of the light incident on the four primary light detectors could be reflected from a top surface of the four primary light detectors. The reflected light could be redirected and/or reflected toward the four secondary light detectors. Such scenarios could be beneficial because the optical beam does not need to be split off and other optical elements (e.g., beamsplitters, mirrors) are not necessary. In other words, the return light could be focused or directed toward the primary light detectors and a portion of the light could be reflected or deflected so as to interact with the secondary light detectors. Other ways to provide reduced coupling to the secondary light detectors are also contemplated and possible. As such, the primary light detectors could be illuminated by a majority (e.g., greater than 90%) of the return light. The secondary light detectors could be illuminated by less than 10% of the return light. In such scenarios, the combination of primary and secondary light detectors could provide a larger dynamic range (e.g., four to six orders of magnitude or more) than a standard detector array.

In some embodiments, the transmit path and the receive path could intersect with the same rotatable mirror. For example, the rotatable mirror could be shaped as a rectangular prism or triangular prism with a plurality of reflective surfaces. In such scenarios, the light emitted from the plurality of light-emitter devices could interact with a portion of the rotatable mirror so as to be redirected toward an external environment of the lidar system via the optical window. Upon interaction with objects in the external environment, at least a portion of the light could be reflected as return light. The return light could interact with the optical window and a second portion of the rotatable mirror and redirected toward the plurality of light detectors. In some embodiments, the first portion of the rotatable mirror and the second portion of the rotatable mirror could be separated by an optical mirror baffle. In such scenarios, the mirror baffle could be coupled to the rotatable mirror and could be shaped like a flat disk. The mirror baffle could be centered about the rotational axis of the rotatable mirror, such that the flat disk is oriented along a plane perpendicular to the rotational axis.

Example systems and methods could optionally utilize optical feedback. As an example, an optical feedback system could include an internal optical path through the optical baffle, and one or more internal reflectors. The transmitter and receiver could be disposed in a common optical cavity. The optical cavity could be substantially separated into a receiver portion and a transmitter portion by the optical baffle. The internal optical path could include a pinhole or other opening in the optical baffle that may optically couple the two portions of the optical cavity. As an example, the opening in the optical baffle could be a circular opening approximately 1 mm in diameter. However, openings of other sizes and/or other shapes are also contemplated and possible.

In some embodiments, the one or more internal reflectors could reflect and/or diffuse light emitted by the transmitter. In such scenarios, the one or more internal reflectors could be disposed so as to reflect and/or diffuse light emitted by the transmitter toward the internal optical path. For example, the emitted light could be reflected from a first internal reflector toward the opening in the optical baffle and into the receiver portion of the optical cavity. Once the light has been redirected into the receiver portion of the optical cavity, it may interact with a second internal reflector. The second internal reflector could be oriented or disposed so as to reflect or diffuse light toward the receiver. In some embodiments, one or both of the internal reflectors could include a specular surface with a geometry that focuses light though the baffle opening 174.

In some embodiments, the receiver includes a plurality of photodetectors. The photodetectors could include, for example, photodetectors, such as silicon photomultipliers (SiPMs) or avalanche photodiodes (APDs). Other types of photodetectors are possible and contemplated. In various examples, the one or more internal reflectors could include a polycarbonate material. Other types of diffusers and/or partially reflecting surfaces and/or materials are possible and contemplated. In some embodiments, the internal reflectors could act as low-efficiency reflectors (e.g., less than 0.1% reflectivity, less than 0.05% reflectivity, or less than 10 reflected photons per billion photons emitted by the receiver). In some embodiments, the internal reflectors could be patterned (e.g., stippled, raised, dimpled, grooved, or otherwise having a non-flat/level surface). In some embodiments, an internal reflector could include a surface with a parabolic section and/or conic section. In such scenarios, the surface of the internal reflector could be curved in one dimension or two dimensions. Optionally, the size of the internal reflector could be configured, adjusted, or selected so as to tune a coupling amount.

In some examples, the optical feedback system could be utilized in lidar applications. For example, the transmitter could also act as a source of ranging light pulses (e.g., emitted from a plurality of light-emitter devices) for the lidar. Furthermore, the receiver could additionally act as a photodetector (or a photodetector array) to determine the time of flight of the light pulses so as to determine the distance to objects in the environment. In some embodiments, the light pulses received via the internal optical path may represent a more reliable "zero-time" reference than those provided by, for example, a calibration target or known features within the environment. Such calibration targets and known features are not always available within the environment. Furthermore, temperature-dependent electronic delays make a one-time calibration process time-consuming and/or inaccurate. Accordingly, a real-time optical feedback system could provide a continuous range reference from which time-dependent offsets can be determined.

Additionally or alternatively, example optical feedback systems could provide a way to more-directly estimate and/or extrapolate the transmit power. That is, in some examples, the amount of light received by the receiver via the internal reflector(s) could be proportional to an overall transmitted optical power. For example, an output signal of one or more of the photodetectors could be compared to a lookup table that provides information about associations between the output signal and the overall transmitted optical power. As such, the optical feedback system could provide a way to directly measure the optical output of a lidar system on a per-shot basis.

In some embodiments, examples systems and methods could include an occlusion detection system. Such an occlusion detection system could provide a way to determine the presence of dust, dirt, and/or cracks in the optical window or another optical element in the systems described herein. The occlusion detection system could include a camera, a flash illuminator, a primary reflective surface, and an optical element (e.g., the optical window). The camera could include a CMOS camera or another type of video capture device. The flash illuminator could include an infrared LED or another type of light-emitter device.

The flash illuminator could be configured to emit light toward the primary reflective surface. The primary reflective surface could be positioned so as to redirect the emitted light toward the rotatable mirror. In some embodiments, the primary reflective surface could be a rectangular-shaped mirror with aspect ratio of at least 8:1 (e.g., length:width). Other shapes of the primary reflective surface are possible. In such scenarios, the rotatable mirror could be configured to rotate about a rotational axis so as to sweep a field of view over a range of angles (e.g., more than 110 degrees in elevation angle). In such a manner, the flash illuminator could provide illumination light to a range of elevation angles based on a rotational position of the reflective surfaces of the rotatable mirror. In such scenarios, a long axis of the primary reflective surface could be disposed substantially parallel to the rotational axis of the rotatable mirror. While example embodiments herein include a primary reflective surface, it will be understood that, in some examples, a primary reflective surface need not be present. Furthermore, while example embodiments include the primary reflective surface as being in a particular location, it will be understood that the primary reflective surface could be located elsewhere. For example, some embodiments may include reflective surfaces along the beam path to facilitate packaging and other spatial (e.g., housing) constraints. In some embodiments, the pulse duration of the flash illuminator could be short relative to the mirror rotation speed. In such scenarios, the rotating mirror is effectively "frozen" while the illuminator is on. Furthermore, the exposure time of the camera can be long relative to the rotation speed of the mirror so that multiple flashes can be used to illuminate the window, thereby increasing the amount of signal on the camera.

The optical element is optically coupled to the rotatable mirror such that at least a portion of the illumination light is incident upon the optical element. The camera could be positioned so as to capture images of the primary reflective surface. In such scenarios, the camera could capture images of various "slice" portions of the optical element as the rotatable mirror rotates about the rotational axis. In some embodiments, the camera could include a fixed focal length lens so as to focus on the optical element. As such, the occlusion detector system could be configured to detect debris, cracks, or other types of occluding objects adjacent to, or within the optical element.

In such scenarios, at least a portion of the occlusion detection system could be disposed within a same optical cavity as that of the receiver and transmitter. For example, the primary reflective surface could be positioned adjacent to, or outside the transmit path of the transmitter and/or the receive path of the receiver so as to avoid optically occluding (e.g., blocking) the primary operation of the lidar system. In such a manner, the occlusion detection system could be configured to detect occlusions on or adjacent to the optical element (e.g., primary optical window) of the lidar system.

II. Example Systems

FIG. 1 illustrates a system 100, according to an example embodiment. In some embodiments, the system 100 could be a laser-based distance and ranging (lidar) system, or a portion thereof. In such scenarios, the system 100 could be configured to emit light pulses into an environment 10 so as to provide information indicative of objects 12 within a field of view 17. As described herein, system 100 could be coupled to a vehicle so as to provide information about an external environment of the vehicle.

System 100 includes a rotatable base 110 configured to rotate about a first axis 102. In some embodiments, a base actuator 112 could be operable to rotate the rotatable base 110 about the first axis 102 at an azimuthal rotational rate between 3 Hertz and 60 Hertz (e.g., between 180 revolutions per minute (RPM) and 3600 RPM). However, other azimuthal rotational rates are possible and contemplated. In some embodiments, the base actuator 112 could be controlled by the controller 150 to rotate at a desired rotational rate. In such scenarios, the controller 150 could control the base actuator 112 to rotate at a single target rotational rate and/or the controller 150 could dynamically adjust a desired rotational rate of the base actuator 112 within a range of possible rotational rates.

In some embodiments, the base actuator 112 could include an electric motor. For example, the electric motor could include a stator 116 and a rotor 114 that could be operable to rotate a shaft 118 of the rotatable base 110. In various embodiments, the base actuator 112 could be a direct current (DC) motor, a brushless motor, or another type of rotational actuator. In some embodiments, the shaft 118 could be coupled to the rotatable base 110 by way of one or more bearings 119. Bearings 119 could include a rotational bearing or another type of low-friction bearing.

In some embodiments, system 100 need not include a rotatable base 110. In such scenarios, one or more elements of the system 100 within housing 160 may be configured to rotate about the first axis 102. However, in other cases, some elements of the system 100 need not rotate about the first axis 102. Accordingly, in such embodiments, system 100 could be utilized in line-scanning applications, single-point scan applications, among other possibilities.

The system 100 also includes a mirror assembly 130 with shaft 134 and a mirror body 133 that is configured to rotate about a mirror rotation axis 131. In some embodiments, the mirror rotation axis 131 could be substantially perpendicular to the first axis 102 (e.g., within 0 to 10 degrees of perpendicular). In an example embodiment, a mirror actuator 136 could be configured to rotate the mirror body 133 about the mirror rotation axis 131 at a mirror rotational rate between 100 Hz to 1000 Hz (e.g., between 6,000 RPM and 60,000 RPM). In some contexts, the mirror body 133 could be configured to rotate about the mirror rotation axis 131 within a period of rotation (e.g., between 3.3 milliseconds and 1 millisecond).

The mirror actuator 136 could be a DC motor, a brushless DC motor, an AC motor, a stepper motor, a servo motor, or another type of rotational actuator. It will be understood that the mirror actuator 136 could be operated at various rotational speeds or at a desired rotational speed, and that the mirror actuator 136 could be controlled by the controller 150.

In example embodiments, the mirror assembly 130 includes a plurality of reflective surfaces 132. For example, the plurality of reflective surfaces 132 could include four reflective surfaces (e.g., reflective surface 132a, 132b, 132c, and 132d). In various embodiments, the reflective surfaces 132 could be formed from at least one of: gold, silicon oxide, titanium oxide, titanium, platinum, or aluminum. In such scenarios, the four reflective surfaces could be arranged symmetrically about the mirror rotation axis 131 such that a mirror body 133 of the mirror assembly 130 has a rectangular prism shape. It will be understood that the mirror assembly 130 could include more or less than four reflective surfaces. Accordingly, the mirror assembly 130 could be shaped as a multi-sided prism shape having more or less than four sides. For example, the mirror assembly 130 could have three reflective surfaces. In such scenarios, the mirror body 133 could have a triangular cross-section.

In some embodiments, the mirror body 133 could be configured to couple the plurality of reflective surfaces 132 to the shaft 134. In such scenarios, the mirror body 133 could be substantially hollow. In various embodiments, at least a portion of the mirror body 133 could have an octagonal cross-section and/or a four-fold symmetry. In one example, mirror body 133 may include a polycarbonate material. In this example, an octagonal and/or four-fold symmetry configuration for mirror body 133 may facilitate reducing potential slippage of the polycarbonate material of the mirror body 133 on the shaft 134 during rotation of the mirror body. Other examples are possible as well.

In some embodiments, the mirror body 133 could include a plurality of flexible support members 138. In such scenarios, at least one flexible support member 138 could be straight. Additionally or alternatively, at least one flexible support member 138 could be curved. In some embodiments, based on a geometry of the system of flexible support members, the mirror body 133 could be stiff in some directions (e.g., to transfer load) and elastic in some directions to accommodate thermal expansion. For example, the flexible support members 138 could be configured to be substantially stiff when in torsion and substantially elastic in response to forces perpendicular to the rotational axis. In various embodiments, the mirror body 133 could be formed from an injection molded material, such as a plastic material. Furthermore, the shaft 134 could be formed from steel or another structural material.

In such scenarios, the mirror assembly 130 could include an encoder magnet 139, which could be coupled to the shaft 134. In such scenarios, the encoder magnet 139 is configured to provide information indicative of a rotational position of the rotatable mirror assembly 130 with respect to the transmitter 127 and the receiver 121.

In some embodiments, encoder magnet 139 may also be configured as a mirror motor magnet (e.g., included in mirror actuator 136). In these embodiments, system 100 may use magnet 139 to facilitate both measuring and adjusting the rotational position of the rotatable mirror assembly 130. In one example embodiment, magnet 139 may be one of a plurality of magnets (e.g., magnet ring, etc.) disposed in a circular arrangement and configured to interact with a magnetic field (e.g., generated at actuator 136) to cause the rotation of the mirror assembly. Other embodiments are possible.

In various examples, the mirror assembly 130 could additionally or alternatively include a coupling bracket 135 configured to couple at least a portion of the mirror assembly 130 to the other elements of system 100, such as housing 160. The coupling bracket 135 could be configured to attach the mirror assembly 130 to the housing 160 by way of one or more connectors 137. In such scenarios, the coupling bracket 135 and the connectors 137 could be configured to be easily removable from other elements of the system 100. Such ease of removability could provide better recalibration, service, and/or repair options.

The system 100 additionally includes an optical cavity 120 coupled to the rotatable base 110. The optical cavity includes a transmitter 127 having at least one light-emitter device 126 and a light-emitter lens 128. In example embodiments, the at least one light-emitter device 126 could include one or more laser diode. Other types of light sources are possible and contemplated. The at least one light-emitter device 126 and the light-emitter lens 128 are arranged so as to define a light-emission axis 18.

In various embodiments, the rotatable mirror assembly 130 could be configured to controllably rotate about the mirror rotation axis 131 so as to transmit emission light toward, and receive return light from, locations within the environment 10.

The optical cavity 120 also includes a receiver 121 configured to detect return light 16 from the environment 10. In various embodiments, the receiver 121 could include a bandpass filter configured to transmit light within a predetermined wavelength band (e.g., infrared light between 800-1600 nanometers). The receiver 121 includes a plurality of photodetectors 122. As an example, the plurality of photodetectors 122 could include at least one solid-state single-photon-sensitive device. For example, in some embodiments, the plurality of photodetectors 122 could include one or more silicon photomultipliers (SiPMs). In such scenarios, the SiPMs could each include a plurality (e.g., a two-dimensional array) of single-photon avalanche diodes (SPADs). Additionally or alternatively, the plurality of photodetectors 122 could include an avalanche photodiode (APD), an infrared photodiode, photoconductor, a PIN diode, or another type of photodetector. Additionally, it will be understood that systems incorporating multiple photodetectors, such as a focal plane array or another type of image sensor, are also possible and contemplated.

The plurality of photodetectors 122 includes a respective set of two or more photodetectors for each light-emitter device of the at least one light-emitter device 126. In various embodiments, the at least one light-emitter device 126 could be configured to emit light pulses that interact with the mirror assembly 130 such that the light pulses are redirected toward an environment 10 of the system 100 as transmit light 14. In such scenarios, at least a portion of the light pulses could be reflected back toward the system 100 as return light 16 and received by the plurality of photodetectors 122 so as to determine at least one of: a time of flight, a range to an object 12, and/or a point cloud.

In example embodiments, the photodetectors 122 could provide an output signal to the controller 150. For example, the output signal could include information indicative of a time of flight of a given light pulse toward a given portion of the field of view 17 of the environment 10. Additionally or alternatively, the output signal could include information indicative of at least a portion of a range map or point cloud of the environment 10.

In some embodiments, each set of two or more photodetectors could include a primary light detector 123 and a secondary light detector 125. The primary light detector 123 is configured to receive a first portion of return light 16 corresponding to light pulses emitted from a given light-emitter device. In such scenarios, the secondary light detector 125 is configured to receive a second portion of return light emitted from the given light-emitter device.

In various embodiments, the first portion of the return light 16 and the second portion of the return light 16 could have widely different intensities. For example, the first portion of the return light 16 could be at least an order of magnitude greater in photon flux than the second portion of the return light 16.

In an example embodiment, the at least one light-emitter device 126 could include a four-element laser diode bar (e.g., four discrete light sources disposed on a laser bar). In such scenarios, the plurality of photodetectors 122 could include four primary light detectors (e.g., primary light detector 123*a*, 123*b*, 123*c*, and 123*d*). Each primary light detector could correspond to a respective light-emitter on the laser diode bar. Additionally, the plurality of photodetectors 122 could include four secondary light detectors (e.g., second light detector 125*a*, 125*b*, 125*c*, and 125*d*). Each secondary light detector could correspond to a respective light-emitter on the laser diode bar.

In alternate embodiments, the at least one light-emitter device 126 may include two or more laser diode bars, and a laser bar may include more or fewer than four light-emitter devices.

In some embodiments, the light-emitter device 126 could be coupled to a laser pulser circuit operable to cause the light-emitter device 126 to emit one or more laser light pulses. In such scenarios, the laser pulser circuit could be coupled to a trigger source, which could include controller 150. The light-emitter device 126 could be configured to emit infrared light (e.g., light having a wavelength between 800-1600 nanometers (nm), such as 905 nm). However, other wavelengths of light are possible and contemplated.

The receiver 121 also includes a photodetector lens 124. The plurality of photodetectors 122 and the photodetector lens 124 are arranged so as to define a light-receiving axis 19.

The receiver 121 additionally includes a plurality of apertures 178, which may be openings in an aperture plate 176. In various embodiments, the aperture plate 176 could have a thickness between 50 microns and 200 microns. Additionally or alternatively, at least one aperture of the plurality of apertures 178 may have a diameter between 150 microns and 300 microns. However, other aperture sizes, larger and smaller than this range, are possible and contemplated. Furthermore, in an example embodiment, the respective apertures of the plurality of apertures 178 could be spaced apart by between 200 microns and 800 microns. Other aperture spacings are possible and contemplated.

The receiver 121 could also include one or more optical redirectors 129. In such a scenario, each optical redirector 129 could be configured to optically couple a respective portion of return light 16 from a respective aperture to at least one photodetector of the plurality of photodetectors 122. For example, each optical redirector could be configured to optically couple a respective portion of return light from a respective aperture to at least one photodetector of the plurality of photodetectors by total internal reflection.

In some embodiments, the optical redirectors 129 could be formed from an injection-moldable optical material. In such scenarios, the optical redirectors 129 are coupled together in element pairs such that a first element pair and a second element pair are shaped to slidably couple with one another. In example embodiments, the optical redirectors 129 are configured to separate the return light 16 into unequal portions so as to illuminate a first photodetector with a first photon flux of a first portion of the return light 16 and illuminate a second photodetector with a second photon flux of a second portion of the return light 16. In some embodiments, one or more surfaces of the optical redirectors 129 could be coated or shaped so as to suppress or eliminate cross-talk between receiver channels. As an example, one or more surfaces of the optical redirectors 129 could be coated with an opaque optical material configured to suppress or eliminate such cross-talk.

In some examples, the optical redirectors 129 may also be configured to expand a beam width of the first portion of the return light 16 projected onto the first photodetector (and/or the second portion of the return light 16 projected onto the second photodetector). In this way, for example, detection area(s) at the respective photodetectors on which respective portion(s) of return light 16 are projected may be greater than the cross-sectional areas of their associated apertures.

In various example embodiments, the rotatable base 110, the mirror assembly 130, and the optical cavity 120 could be disposed so as to provide a field of view 17. In some embodiments, the field of view 17 could include an azimuthal angle range of 360 degrees about the first axis 102 and an elevation angle range of between 60 degrees and 120 degrees (e.g., at least 100 degrees) about the mirror rotation axis 131. In one embodiment, the elevation angle range could be configured to allow system 100 to direct one or more emitted beams along the direction (and/or substantially parallel to) the first axis 102. It will be understood the other azimuthal angle ranges and elevation angle ranges are possible and contemplated.

In some embodiments, the field of view 17 could have two or more continuous angle ranges (e.g., a "split" field of view or a discontinuous field of view). In one embodiment, the two or more continuous angle ranges may extend away from a same side of the first axis 102. Alternatively, in another embodiment, the two or more continuous angle ranges may extend away from opposite sides of the first axis 102. For example, a first side of the first axis 102 may be associated with elevation angles between 0 degrees and 180 degrees, and a second side of the first axis may be associated with elevation angles between 180 degrees and 360 degrees.

In some embodiments, the system 100 includes a rotatable housing 160 having an optical window 162. The optical window 162 could include a flat window. Additionally or alternatively, the optical window 162 could include a curved window and/or a window with refractive optical power. As an example, the curved window could provide an extended field of view (compared to a flat optical window) in exchange for some loss or degradation in the quality of the optical beam. In such scenarios, the light pulses could be emitted toward, transmitted through, and received from, the environment 10 through the optical window 162. Furthermore, although one optical window is described in various embodiments herein, it will be understood that examples with more than one optical window are possible and contemplated.

The optical window 162 could be substantially transparent to light having wavelengths such as those of the emitted light pulses (e.g., infrared wavelengths). For example, the optical window 162 could include optically transparent materials configured to transmit the emitted light pulses with a transmission efficiency greater than 80% in the infrared wavelength range. In one embodiment, the transmission efficiency of the optical window 162 may be greater than or equal to 98%. In another embodiment, the transmission efficiency of the optical window 162 may vary depending on the angles-of-incidence of the transmit and/or receive light incident on the optical window 162. For instance, the transmission efficiency may be lower when light is incident on the optical window from relatively higher angles-of-incidence than when the light is incident from relatively lower angles-of-incidence.

In some examples, the optical window 162 could be formed from a polymeric material (e.g., polycarbonate, acrylic, etc.), glass, quartz, or sapphire. It will be understood that other optical materials that are substantially transparent to infrared light are possible and contemplated.

In some embodiments, other portions of the rotatable housing 160 could be coated with, or be formed from, an optically absorptive material such as black tape, absorptive paint, carbon black, black anodization, micro-arc oxidation treated surface or material, and/or another type of optically absorptive, anti-reflective surface or material.

The various elements of system 100 could be disposed in different arrangements. For example, in an example embodiment, at least one of the light-receiving axis 19 or the light-emission axis 18 does not intersect the mirror rotation axis 131.

The system 100 includes a controller 150. In some embodiments, the controller 150 includes at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, graphics processor units, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic, or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of system 100. As such, the memory 154 may include program instructions to perform or facilitate some or all of the operations or functionalities described herein.

For example, the operations could include causing the light-emitter device 126 to emit the light pulses. In such scenarios, the controller 150 could cause a pulser circuit associated with light-emitter device 126 to provide one or more current/voltage pulses to the light-emitter device 126, which may cause the light-emitter device 126 to provide the light pulses.

The operations could also include receiving at least a first portion of reflected light pulses (e.g., return light 16) from the field of view 17 as a detected light signal. For example, at least some of the light pulses emitted from the light-emitter device 126 via the optical window 162 (e.g., transmit light 14) could interact with objects 12 in the environment 10 in the field of view 17 so as to provide reflected light pulses or return light 16. At least the portion of the reflected light pulses could be received by at least one photodetector of the plurality of photodetectors 122. In turn, the given photodetector could provide a detected light signal, which could include a photocurrent signal or a photovoltage signal.

Furthermore, the operations could include determining, based on the detected light signal, a point cloud indicative of objects 12 within the field of view 17. In an example embodiment, determining the point cloud could be performed by controller 150. For example, the controller 150 could determine and accumulate a plurality of spatial points based on a respective time of flight for each light pulse emitted and received. Determining the point cloud could be further based on an elevation angle of the mirror assembly 130 and an azimuthal angle of the rotatable base 110.

It will be understood that some or all of the operations described herein could be carried out by computing devices located remotely from the controller 150 and/or other elements of system 100.

In various embodiments, the system 100 could include at least one baffle. For example, the system 100 could include at least one rotatable baffle 170 and/or at least one static baffle 172. In such scenarios, the at least one rotatable baffle 170 and/or at least one static baffle 172 could be configured to reduce stray light within the optical cavity 120 (e.g., light traveling internally from the light-emitter device 126 to the plurality of photodetectors 122 without first interacting with the environment around the system 100). In an example embodiment, the static baffle 172 could include an optically-opaque material disposed between the light-receiving axis 19 and the light-emission axis 18. In some embodiments, the rotatable baffle 170 could be coupled to the mirror body 133 and could also include an optically-opaque material configured to reduce or eliminate stray light between the transmitter portions and the receiver portions of the system 100. In other words, a first portion of the mirror body 133 and a second portion of the mirror body 133 could be separated by the rotatable baffle 170. In such scenarios, the rotatable baffle 170 could be shaped like a flat disk, however other shapes are contemplated and possible. The rotatable baffle 170 could be centered about, and perpendicular to, the mirror rotation axis 131.

In some embodiments, the static baffle 172 could extend toward the mirror rotation axis 131 and the rotatable baffle(s) 170 could extend away from the mirror rotation axis 131 so that the static baffle 172 and rotatable baffle(s) 170 could overlap so as to reduce stray light between the transmitter portions and the receiver portions of the system 100. The amount of overlap could be adjusted and/or increased so as to minimize stray light.

In some embodiments, the system 100 could include an optical feedback system. As a part of the optical feedback system, the transmitter 127 could be configured to transmit, during the period of rotation of the mirror body 133, a plurality of light pulses toward the reflective surfaces 132 of the mirror assembly 130. In such a scenario, the mirror assembly 130 could be configured to (i) reflect at least a first light pulse of the plurality light pulses into an environment 10 of the system 100 and (ii) reflect at least a second light pulse of the plurality of light pulses into an internal optical path 168. In some embodiments, the internal optical path 168 may include a baffle opening 174 in the rotatable baffle 170, the static baffle 172, and/or in a gap between the rotatable baffle 170 and the static baffle 172.

In such scenarios, the plurality of photodetectors 122 of the receiver 121 could be configured to (i) detect a reflected light pulse including a reflection of the first light pulse caused by an object 12 in the environment 10 and (ii) detect the second light pulse received via the internal optical path 168. In various embodiments, the internal optical path 168 could be defined at least in part by one or more internal reflectors 180 that reflect the second light pulse toward the reflective surfaces 132 of the mirror assembly 130 such that the reflective surfaces 132 reflect the second light pulse toward the receiver 121.

Furthermore, in such scenarios, the controller 150 could be configured to determine a distance to the object 12 in the environment 10 based on a time when the first light pulse is transmitted by the transmitter 127, a time when the first light pulse is detected by the photodetector 122, a time when the second light pulse is emitted/transmitted by the transmitter 127, and a time when the second light pulse is detected by the photodetector 122. In such scenarios, a first light pulse (and its corresponding reflected light pulse) could provide information indicative of a distance to an object and a second light pulse (and its corresponding reflected light pulse) could provide information indicative of a feedback distance or zero-length reference.

An occlusion detection system of system 100 could include a primary reflective surface 163. In some embodiments, the primary reflective surface 163 could include a rectangular mirror with an aspect ratio of at least 8:1. However, it will be understood that other shapes of the primary reflective surface 163 are contemplated and possible within the context of the present disclosure. In example embodiments, the primary reflective surface 163 could include a long axis that is disposed substantially parallel to the mirror rotation axis 131.

In such a scenario, the reflective surfaces 132 of the mirror body 133 could represent a plurality of secondary reflective surfaces. System 100 could also include a camera 166. The camera 166 is configured to capture at least one image of an optical element (e.g., the optical window 162) by way of the primary reflective surface 163 and at least one secondary reflective surface of the mirror body 133.

In such scenarios, the controller 150 may be configured to carry out further operations relating to occlusion detection. Such operations could include causing the camera 166 to capture a plurality of images of the optical element by way of the primary reflective surface 163 and at least one secondary reflective surface of the mirror body 133. Each image of the plurality of images is captured at a corresponding mirror angle of the at least one secondary reflective surface.

The system 100 additionally includes an illuminator 161. In some embodiments, the illuminator 161 could include an infrared light-emitting diode (LED). In such scenarios, the operations of the controller 150 could additionally include while causing the camera 166 to capture the plurality of images, causing the illuminator 161 to emit light to illuminate the optical element by way of the primary reflective surface 163 and at least one secondary reflective surface of the mirror body 133.

The operations may additionally include determining an aggregate image of the optical element based on the plurality of images and the corresponding mirror angles of the at least one secondary reflective surface.

Additionally or alternatively, the operations could include determining, based on the aggregate image, that at least one occlusion object is present on the optical element.

In some embodiments, the camera includes a fixed focal length lens configured to focus on the optical element by way of the primary reflective surface and the at least one secondary reflective surface. As an example, the camera could include a video capture device.

Figure 2A:
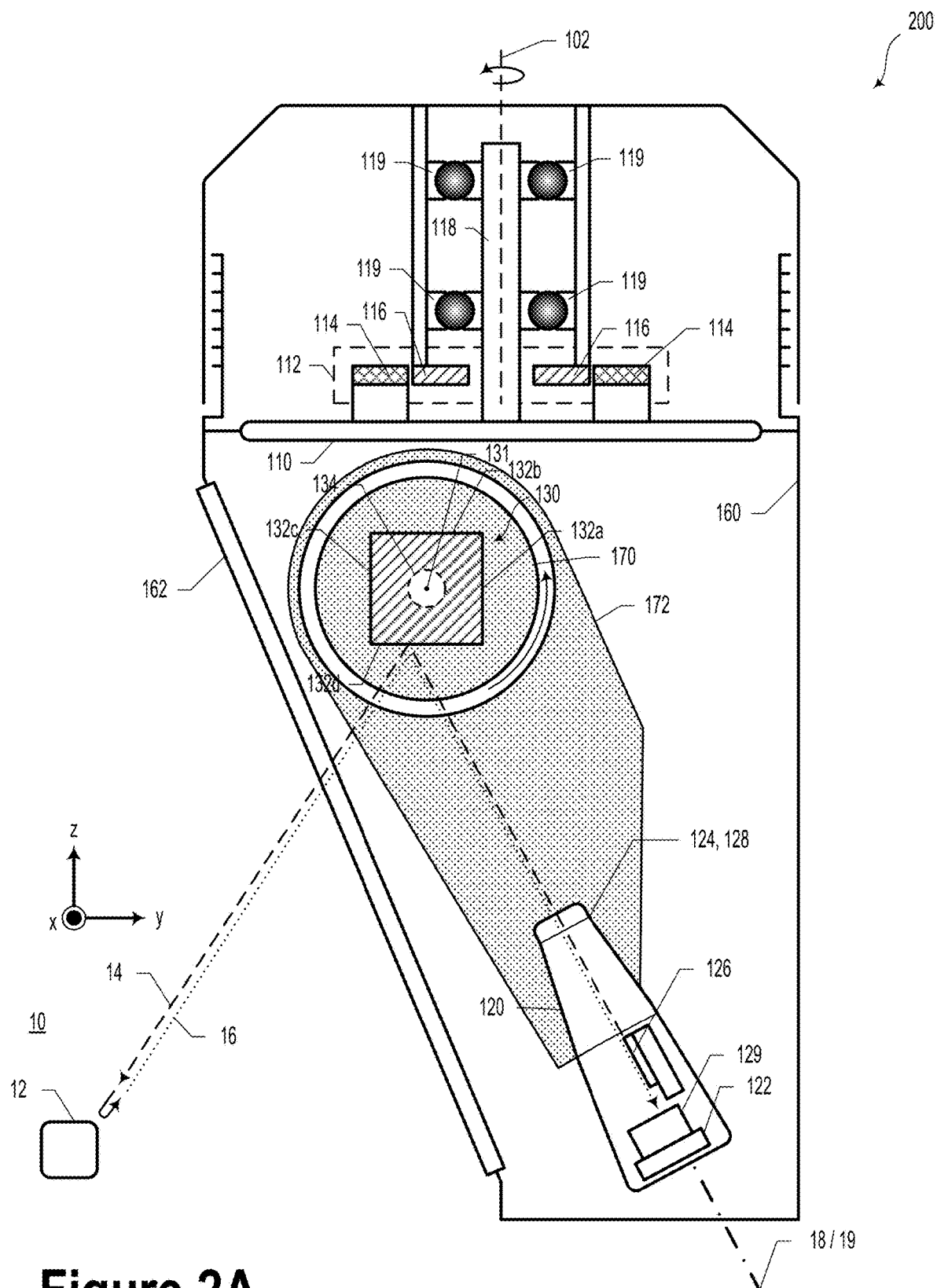
FIG. 2A illustrates a system, according to an example embodiment.

FIG. 2A illustrates a system 200, according to an example embodiment. System 200 could be similar or identical to system 100, which is illustrated and described in relation to FIG. 1. For example, system 200 could include a rotatable base 110. The rotatable base 110 could be configured to rotate about first axis 102. Furthermore, system 200 could include an optical cavity 120, which could include light-emitter device 126, light-emitter lens 128, photodetector 122, and photodetector lens 124. Furthermore, in some embodiments, system 200 could include a mirror assembly 130. The mirror assembly 130 could include a plurality of reflective surfaces 132a, 132b, and 132c and a shaft 134. The mirror assembly 130 could be configured to rotate about a mirror rotation axis 131.

In some embodiments, the light-emitter device 126 and the light-emitter lens 128 could form a light-emission axis 18. As illustrated in FIG. 2A, light pulses emitted by the light-emitter device 126 could interact with reflective surface 132d so as to be reflected toward the optical window 162 and transmitted toward the object 12 in the environment 10.

In some embodiments, the photodetector 122 and the photodetector lens 124 could form a light-receiving axis 19. Light pulses emitted by the light-emitter device 126 could be reflected or otherwise interact with the environment and could be received as return light 16 by way of the reflective surfaces 132 (e.g., reflective surface 132d) and observed at the plurality of photodetectors 122 by way of one or more optical redirectors 129.

Figure 2B:
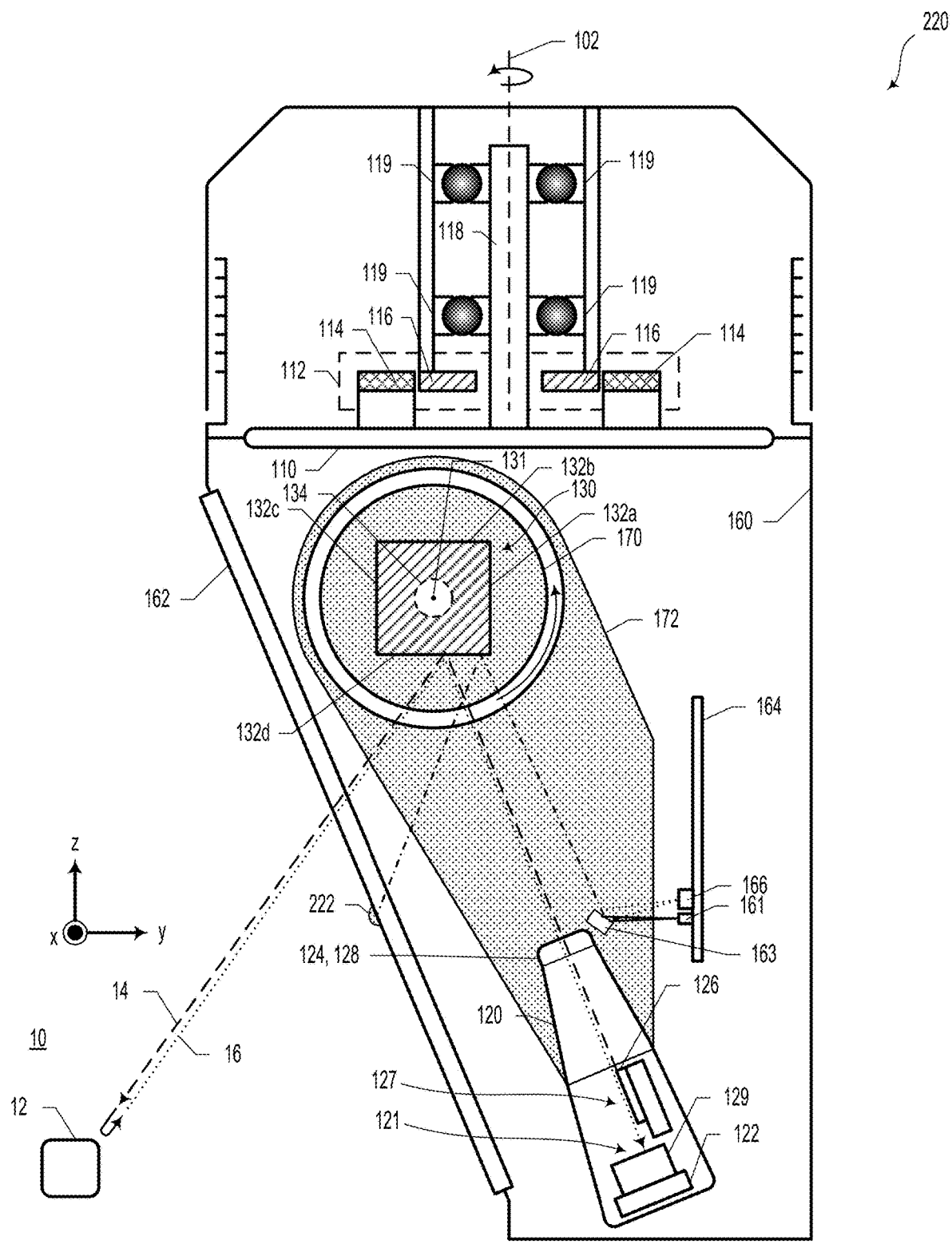
FIG. 2B illustrates a system, according to an example embodiment.

FIG. 2B illustrates a system 220, according to an example embodiment. System 220 could be similar or identical to system 100 and system 200, as illustrated and described in relation to FIGS. 1 and 2A, respectively. In some embodiments, system 220 could include an occlusion detection system. The occlusion detection system could be configured to provide information indicative of a presence of an occlusion object 222 associated with (e.g., coupled to) the optical window 162. It will be understood that while FIG. 2B illustrates the occlusion object 222 as being on an external surface of the optical window 162, other occlusion objects could be located elsewhere, such as along an internal surface of the optical window 162 or as an integral part of the optical window 162, itself, such as a crack or a cloudy or opaque region of the optical window 162.

As illustrated in FIG. 2B, system 220 could include a transmitter 127 and a receiver 121. System 220 includes an optical window 162 and a primary reflective surface 163. System 220 also includes a mirror assembly 130 configured to rotate about a mirror rotation axis 131. The mirror assembly 130 includes a plurality of reflective surfaces 132, referred to here as secondary reflective surfaces.

The system 220 includes a camera 166 that is configured to capture at least one image of the optical window 162 by way of the primary reflective surface 163 and at least one secondary reflective surface of the mirror assembly 130.

The system 220 also includes a controller (e.g., controller 150) having at least one processor and a memory. The at least one processor executes program instructions stored in the memory so as to carry out operations. The operations include causing the mirror assembly 130 to rotate about the mirror rotation axis 131.

The operations also include causing the camera 166 to capture a plurality of images of the optical window 162 by way of the primary reflective surface 163 and at least one secondary reflective surface of the mirror assembly 130. Each image of the plurality of images is captured at a corresponding mirror angle of the at least one secondary reflective surface.

In some embodiments, the operations include determining an aggregate image of the optical window 162 based on the plurality of images and the corresponding mirror angles of the at least one secondary reflective surface.

In some embodiments, the operations of controller 150 could additionally include determining, based on the aggregate image, that at least one occlusion object 222 is present on, or integral to, the optical window 162. In some embodiments, in response to determining the at least one occlusion object 222, the controller 150 could adjust subsequent operations of the system 100 to account for the occlusion object 222. For example, the controller 150 could adjust lidar scans and/or camera images so as to ignore or adjust point cloud and/or image information that corresponds to a region of the field of view 17 that could be affected by the occlusion object 222. In other embodiments, the controller 150 could provide a notification about the occlusion object 222. Based on the notification, the system 100 could transmit a service request to clean the optical window 162 and/or cause an associated vehicle (e.g., vehicle 500) to travel to a service location for optical window cleaning. In other embodiments, the system 100 could provide a notification to request further information from other sensors (e.g., other lidar systems) that could provide information about regions of the field of view 17 that might be obscured or otherwise affected by the occlusion object 222. Other ways to obtain backup or substitute information from other sensor systems are possible and contemplated. Furthermore, it will be understood that other adjustments could be made to the operations of system 100 so as to compensate for the presence of the occlusion object and/or to maintain safe and reliable operations of the system 100.

Figure 2C:
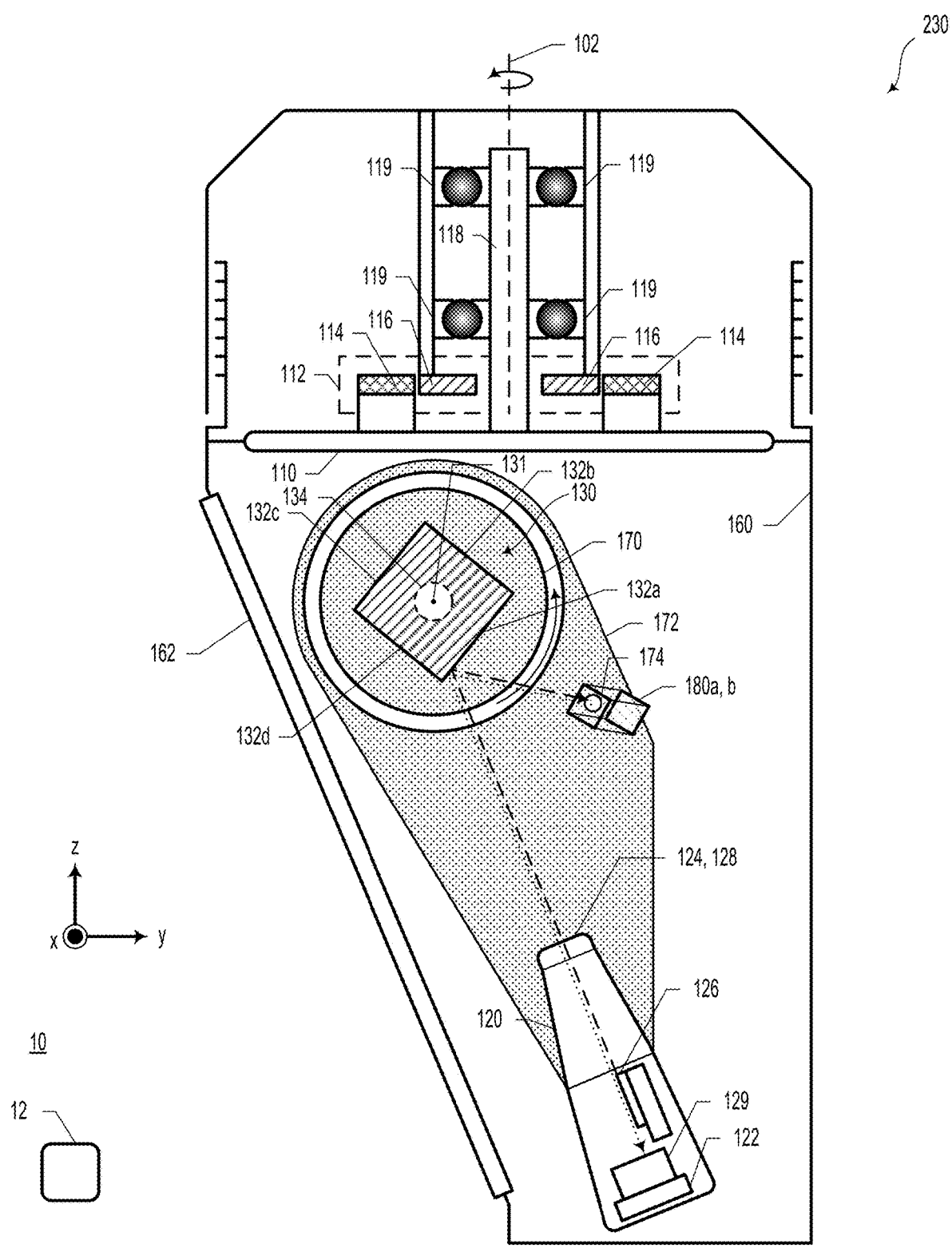
FIG. 2C illustrates a system, according to an example embodiment.

FIG. 2C illustrates a system 230, according to an example embodiment. System 230 could illustrate an optical feedback system, which could include one or more internal reflectors 180 (e.g., first internal reflector 180a and second internal reflector 180b). In example embodiments, the first internal reflector 180a and the second internal reflector 180b could be diffuse reflectors.

As illustrated in FIG. 2C, a particular rotational angle of the mirror body 133 and corresponding reflective surfaces 132 could result in an emitted light pulse (herein referred to as a "second light pulse") being reflected from a transmitter portion of the mirror body 133 toward the first internal reflector 180a. In such a scenario, the first internal reflector 180a could be configured to reflect the second light pulse through the baffle opening 174 toward the second internal reflector 180b. The second internal reflector 180b could be configured to reflect the second light pulse toward a receiver portion of the mirror body 133 and corresponding reflective surfaces 132. In turn, the reflective surface 132 could reflect the second light pulse toward the receiver 121.

Figure 2D:
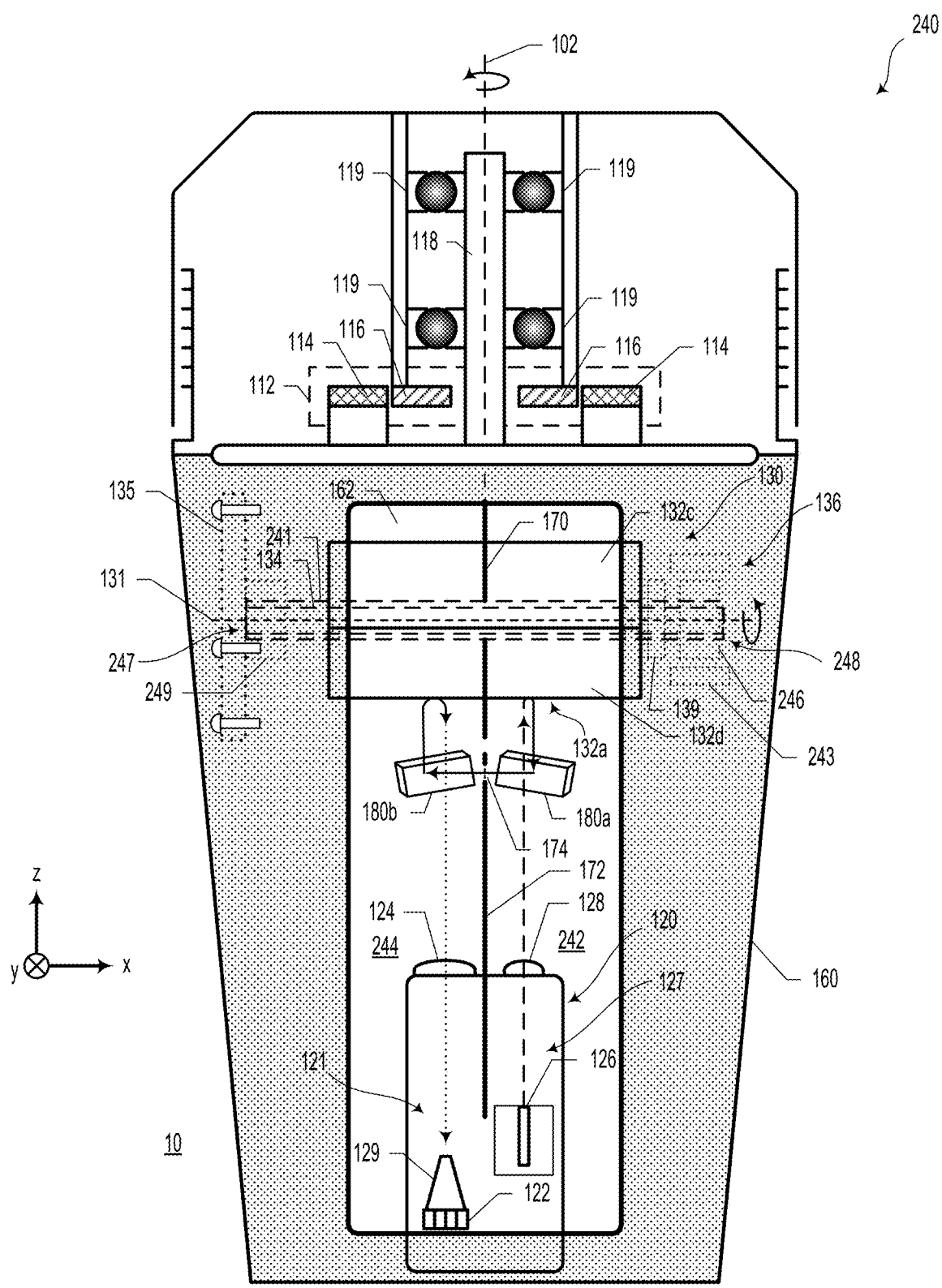
FIG. 2D illustrates an alternate view of the system of FIG. 2C, according to an example embodiment.

FIG. 2D illustrates an alternate view 240 of the system 230 of FIG. 2C, according to an example embodiment. As illustrated in FIG. 2D, the transmitter 127 includes a light-emitter lens 128 configured to transmit light pulses into a first space 242 between the light-emitter lens 128 and a first portion of the mirror body 133. Furthermore, the receiver 121 includes a photodetector lens 124 configured to receive light pulses reflected by a second portion of the mirror body 133 into a second space 244 between the second portion of the mirror body 133 and the photodetector lens 124. In such scenarios, the first internal reflector 180a could be disposed in the first space 242 and the second reflector could be disposed in the second space 244.

As illustrated in FIG. 2D, the static baffle 172 separates the first space 242 and the second space 244. In such a scenario, the static baffle 172 includes a baffle opening 174. As illustrated, the first internal reflector 180a could be configured to reflect the second light pulse toward the second internal reflector 180b through the baffle opening 174. Put another way, the static baffle 172 and the rotatable baffle 170 could define a transmit side of the reflective surfaces 132 and a receive side of the reflective surfaces 132. In such scenarios, the transmitter 127 is configured to emit the emission light toward the transmit side of the reflective surfaces 132. Additionally, the receiver 121 is configured to receive return light 16 via the receive side of the reflective surfaces 132.

In an example embodiment, the mirror body 133 and corresponding reflective surfaces 132 could reflect a "first light pulse" into the environment 10 during a first part of the period of rotation of the mirror body 133. In such a scenario, the mirror body 133 and corresponding reflective surfaces 132 could reflect the second light pulse toward the first internal reflector 180a during a second part of the period of rotation of the mirror body 133.

As described herein, the light pulses received via the internal optical path 168 could provide a more reliable "zero-time" reference for system 100 than those provided by, for example, a calibration target and/or known features within the environment.

Additionally or alternatively, the optical feedback systems described herein could provide a way to directly estimate and/or extrapolate the transmit power of light pulses emitted by the transmitter 127. That is, in some examples, the amount of light received by the receiver 121 via the internal reflector(s) 180 could be proportional to an overall transmitted optical power. In such scenarios, an output signal of one or more of the photodetectors could be compared to a lookup table that provides information about associations between the output signal and the overall transmitted optical power. As such, the optical feedback system could provide a way to directly measure the optical output of the transmitter 127 of system 100 on a per-shot basis.

As illustrated in FIG. 2D, the shaft 134 could have a first end 247 and a second end 248 opposite the first end 247. In such scenarios, the mirror actuator 136 could be coupled to the second end 248 of the shaft 134. Additionally or alternatively, the mirror assembly 130 could include one or more bearings 249, each bearing having an inner race and an outer race. As an example, bearing 249 could include a cylinder bearing. However, it will be understood that other types of rotational bearings are possible and contemplated. In such scenarios, the inner race of at least one bearing 249 could be coupled to the shaft 134 proximate the first end 247. Additionally or alternatively, the coupling bracket 135 could be coupled to the outer race of the bearing 249. In such scenarios, the coupling bracket 135 could be removably mounted to the housing 160.

In various embodiments, a plastic material 241 could be disposed on at least a portion of the shaft 134 between the first end 247 and the second end 248. As an example, the plastic material 241 could be coupled to the shaft 134 in the form of a coating or as a separate plastic part (e.g., mirror body 133). Additionally or alternatively, the plastic material 241 could include an inner portion disposed on the shaft 134, an outer portion on which the reflective material is disposed (e.g., to provide the reflective surfaces 132), a space between the inner portion and outer portion, and a plurality of couplings (e.g., flexible members 138) extending between the inner portion and the outer portion. In such a scenario, each coupling of the plurality of couplings may include a radial member and a cross-bar member, as described in relation to FIG. 3B. Additionally or alternatively, the cross-bar member could extend between a first side of the outer portion and a second side of the outer portion. Furthermore, the radial member could extend between the inner portion and the cross-bar member. Additionally, the first side of the outer portion could support a first reflective surface and the second side of the outer portion could support a second reflective surface.

In some examples, the mirror actuator 136 could include: a) at least one magnet 246 (e.g., a rotor magnet) disposed on the plastic material 241 proximate to the second end 248 of the shaft 134; and b) a stator 243 configured to interact with the at least one magnet 246 to rotate the mirror assembly 130 about the rotational axis 131. As described herein, the shaft 134 could be formed from a metal. In such a scenario, the plurality of couplings could be configured to be flexible in a directional perpendicular to the rotational axis 131, such that the plurality of couplings accommodate for a thermal expansion difference between the metal and the plastic material 241.

In some embodiments, the encoder magnet 139 could be disposed on the plastic material 241 proximate the second end 248 of the shaft 134. In such scenarios, the encoder magnet 139 could be configured to provide information indicative of a rotational position of the mirror assembly 130 with respect to the transmitter 127 and the receiver 121.

While FIGS. 2C and 2D illustrate mirror elements configured to direct light through the baffle opening 174 (e.g., first internal reflector 180a and second internal reflector 180b), it will be understood that other ways to collect and direct light through the baffle opening 174 are possible and contemplated. For example, an optical material (e.g., glass or plastic) could be disposed proximate to the baffle opening so as to collect a portion of emitted light from the light emitter 126 and direct it (e.g., via total internal reflection) through the baffle opening 174. In such a scenario, the optical material could be formed in the shape of a rod that extends between the receiver portion and transmit portion of the optical cavity 120. A light pulse interacting with the transmit portion of the rod would cause light to get scattered throughout the rod. Some of the scattered light would be transmitted through the rod to the receive side of the rod, which could be detected by the photodetector 122.

Figure 3A:
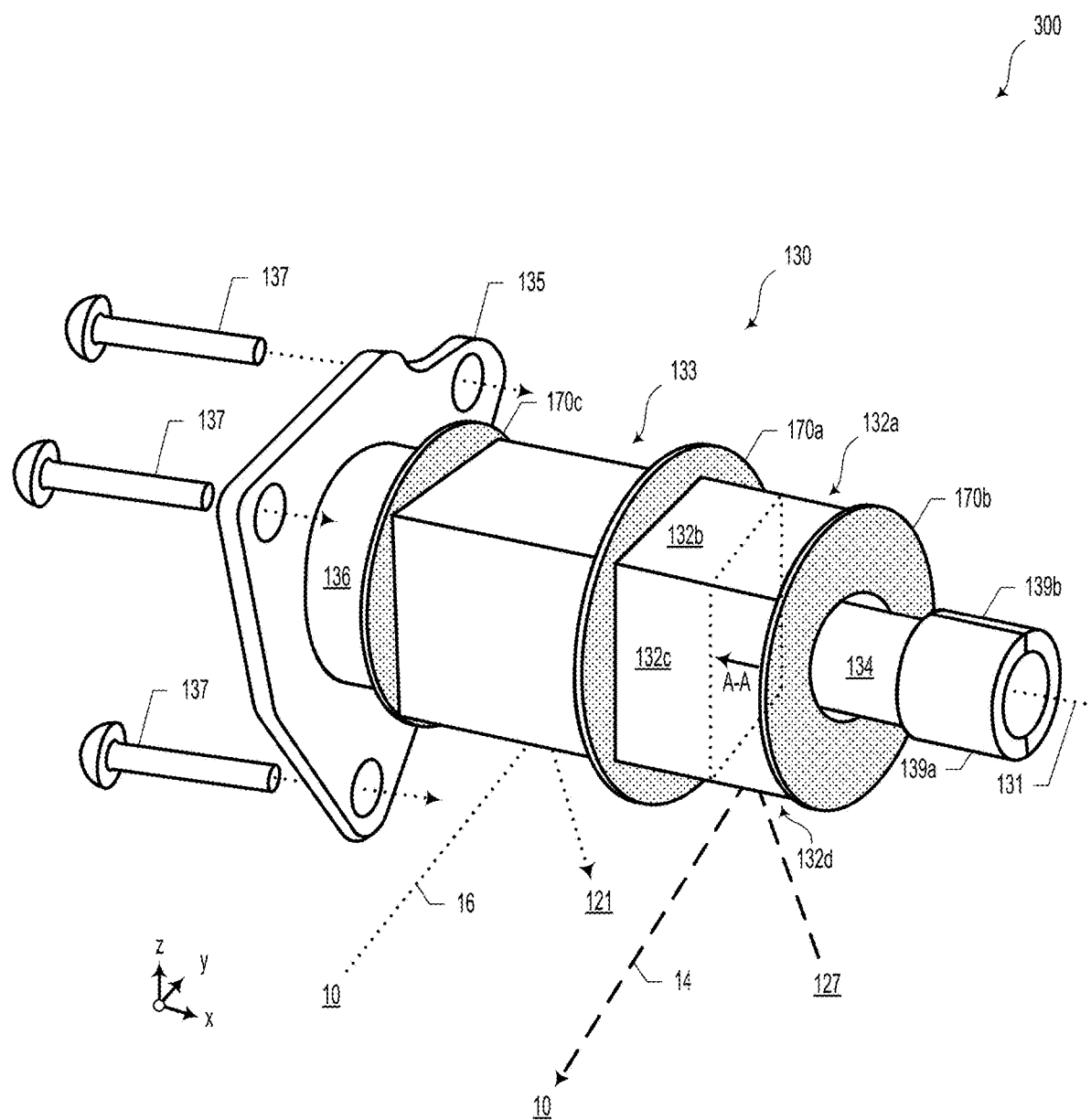
FIG. 3A illustrates a mirror assembly, according to an example embodiment.

FIG. 3A illustrates a mirror assembly 300, according to an example embodiment. Mirror assembly 300 could be similar or identical to the mirror assembly 130 illustrated and described in relation to FIG. 1. For example, mirror assembly 300 could include a plurality of reflective surfaces 132a, 132b, 132c, and 132d. The mirror assembly 300 could additionally include a shaft 134, which could be configured to rotate about the mirror rotation axis 131.

In some embodiments, the transmitter 127 could emit light pulses toward the mirror assembly 300 along a light-emission axis 18. A reflective surface 132*d* of the mirror assembly 300 could reflect such light pulses such that they are transmitted toward an external environment 10.

In such examples, light from the environment 10 (e.g., return light 16) could be reflected by the reflective surface 132*d* of the mirror assembly 300. In some embodiments, the received light could be directed along light-receiving axis 19 toward the receiver 121.

Figure 3B:
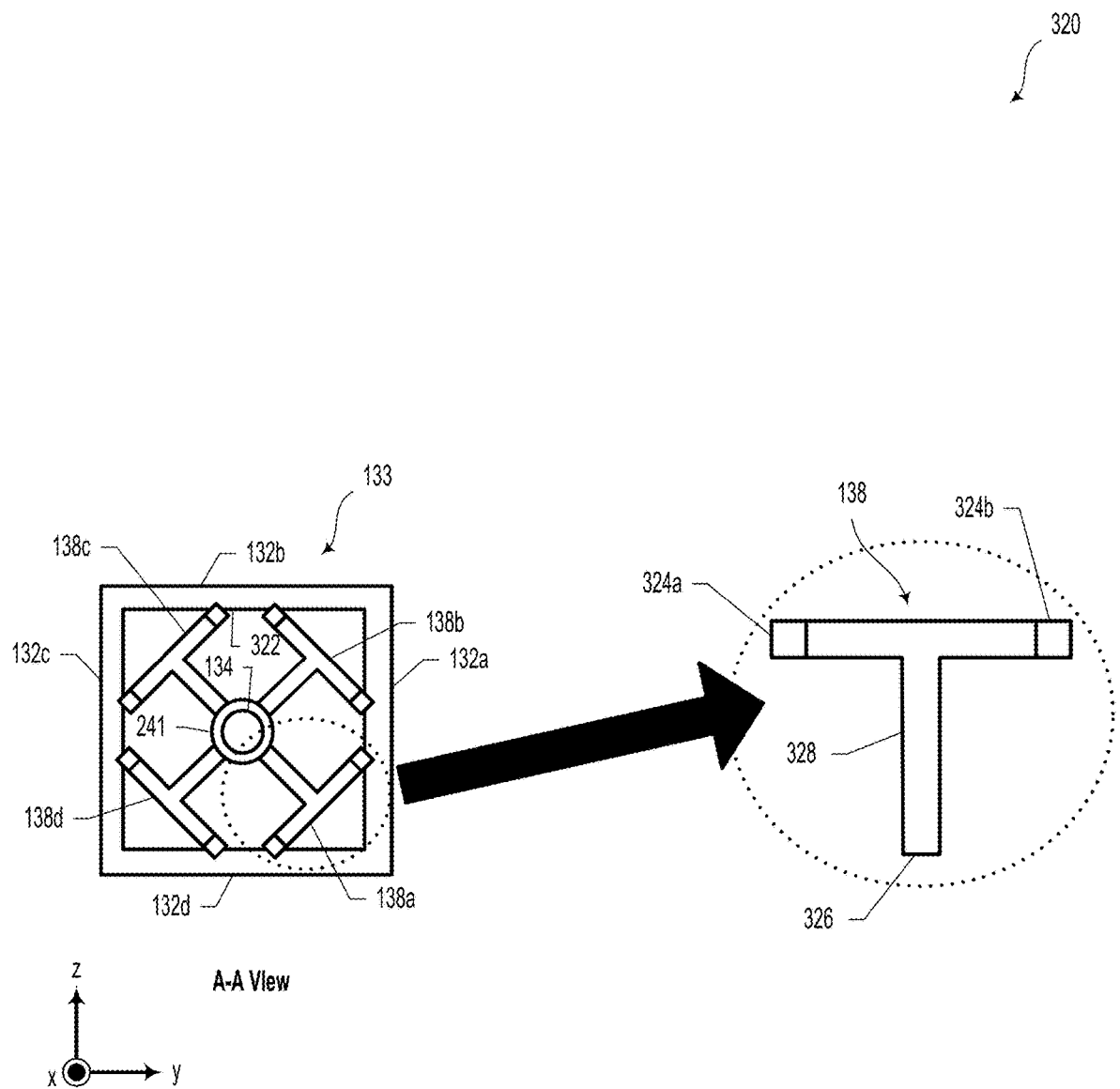
FIG. 3B illustrates a portion of the mirror assembly of FIG. 3A, according to an example embodiment.

FIG. 3B illustrates a portion 320 of the mirror assembly 300 of FIG. 3A, according to an example embodiment. The shaft 134 and the respective reflective surfaces 132*a*, 132*b*, 132*c*, and 132*d* could be coupled by way of one or more flexible members 138 (e.g., flexible members 138*a*, 138*b*, 138*c*, and 138*d*). In some embodiments, flexible members 138*a*, 138*b*, 138*c*, and 138*d* could provide a flexible (e.g., flexural) structural support between the shaft 134 and an interior surface 322 of the mirror body 133. As described herein, the shaft 134 could be surrounded and/or coated, at least in part, by plastic material 241.

In example embodiments, the flexible members 138 could be t-shaped. Additionally or alternatively, the flexible members 138 could have an elongated t-shape. That is, the t-shape could be extended lengthwise along the x-axis. Other shapes are possible and contemplated.

In some embodiments, the flexible members 138 could each include two first ends 324*a* and 324*b* and a second end 326. In such a scenario, the two first ends 324*a* and 324*b* and the second end 326 could be coupled by way of a t-shaped member 328. As illustrated, the two first ends 324*a* and 324*b* could couple to two different interior surfaces that correspond to (are located opposite) two different reflective surfaces 132 of the mirror body 133.

In some embodiments, the two first ends 324*a* and 324*b* could be formed from a first material and the second end 326 could be formed from a second, different, material. As an example, various portions of the support member 138 could be formed from, without limitation, plastic (e.g., polypropylene, polyethylene, polycarbonate, silicone, etc.), rubber (e.g., latex, etc.), metal (e.g., aluminum, steel, titanium, etc.), and/or ceramic. It will be understood that other materials and material combinations are possible and contemplated within the scope of the present disclosure.

In example embodiments, the materials and/or geometry for one or more elements of the flexible members 138 could be selected so as to reduce or minimize the effect of differences in the coefficient of thermal expansion between, for example, the shaft 134 and the reflective surfaces 132. For example, the two first ends 324*a* and 324*b* could be selected to be silicone so as to provide a compliant, flexible material that is relatively insensitive to thermal variations. Additionally or alternatively, in some embodiments, the t-shaped member 328 could be formed from a flexible material so as to reduce or minimize the forces upon, or relative displacement of, the reflective surfaces 132 from the shaft 134. Such forces and/or displacement could be due, at least in part, to differences in the coefficient of thermal expansion. Accordingly, by utilizing the disclosed flexible members 138, mirror assembly 130 and/or other portions of system 100 could be less affected by fluctuation in temperature, temperature-dependent material bowing or displacement, and/or long term temperature-cycling effects (e.g., thermal destressing).

FIGS. 3C-3H illustrate respective cross-sectional views of mirror assemblies and baffle arrangements, according to example embodiments. The various embodiments illustrated in FIGS. 3C-3H could be utilized to reduce or eliminate stray light that may impinge at a grazing angle (e.g., less than 10 degrees) relative to the primary baffle surface. Such stray light sources may include, for example, light that reflects from the optical window 162, other elements of lidar device 100, objects 12 in the environment 10, and/or light that may be emitted by other light sources. Furthermore, while FIGS. 3C-3H illustrate the presence of a static baffle 172 and a rotatable baffle 170*a*, it will be understood that other examples need not include the rotatable baffle 170*a*. That is, some embodiments could include a variously-shaped and/or -sized static baffle 172 without a corresponding rotatable baffle portion.

Figure 3C:
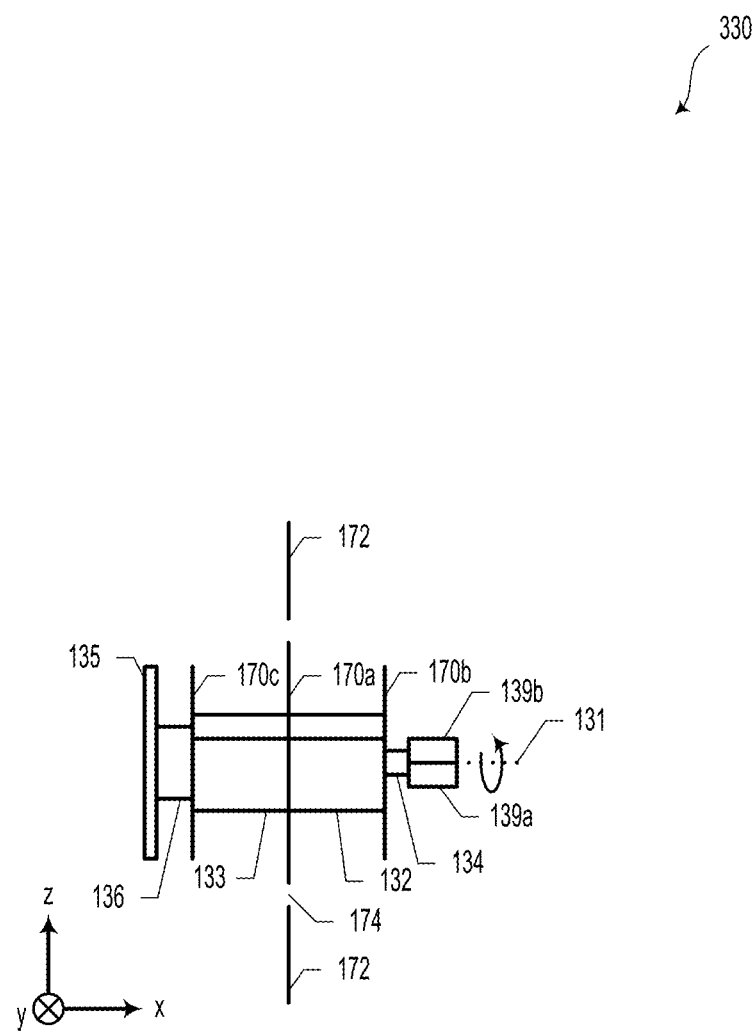
FIG. 3C illustrates a mirror assembly and baffle arrangement, according to an example embodiment.

FIG. 3C illustrates a cross-sectional view of a baffle arrangement 330 that includes a static baffle 172 and a rotatable baffle 170*a* that are disposed so as to provide a baffle opening 174. In some embodiments, the baffle opening 174 could be sized so as to provide a desired gap between the transmitter and receiver portions of the optical cavity 120. In some embodiments, the baffle opening 174 may provide needed mechanical freedom so that the rotatable baffle 170*a* may rotate freely without colliding with the static baffle 172.

Figure 3D:
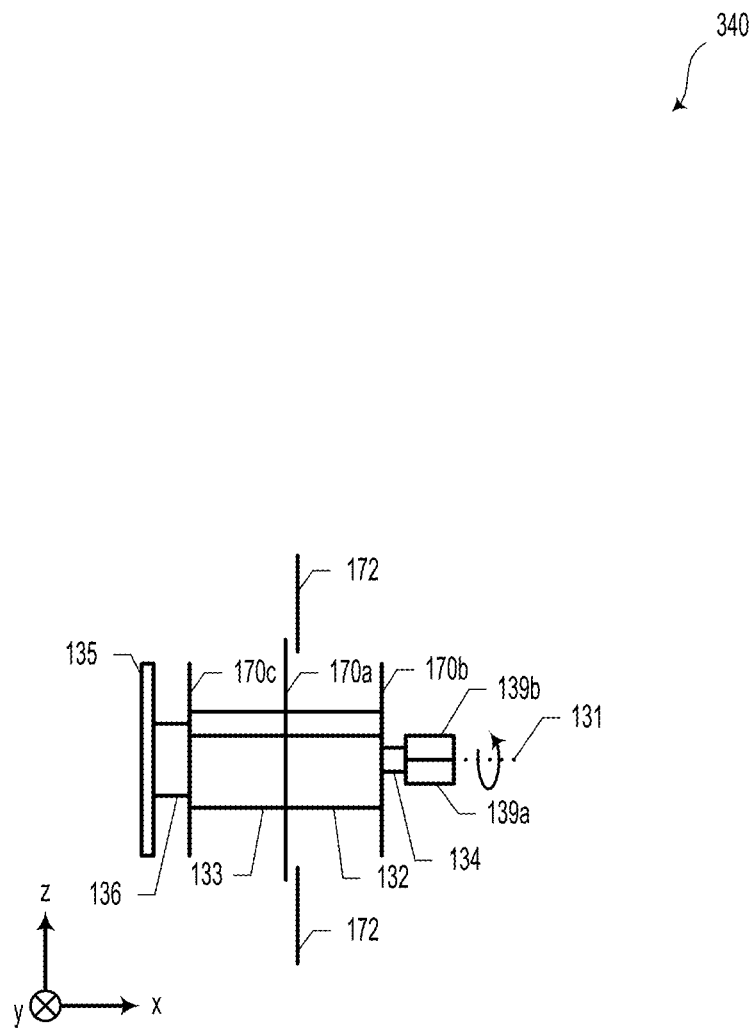
FIG. 3D illustrates a mirror assembly and baffle arrangement, according to an example embodiment.

FIG. 3D illustrates a cross-sectional view of a baffle arrangement 340 that includes a static baffle 172 and a rotatable baffle 170*a* that are overlapped along an axis parallel to the rotational axis 131 so as to avoid a direct baffle opening. That is, the overlapped baffle arrangement 340 may provide improved optical isolation between the transmitter and receiver portions of the optical cavity 120. In other words, the overlapped baffle arrangement 340 could reduce light leakage and/or internal reflections within the optical cavity 120.

Figure 3E:
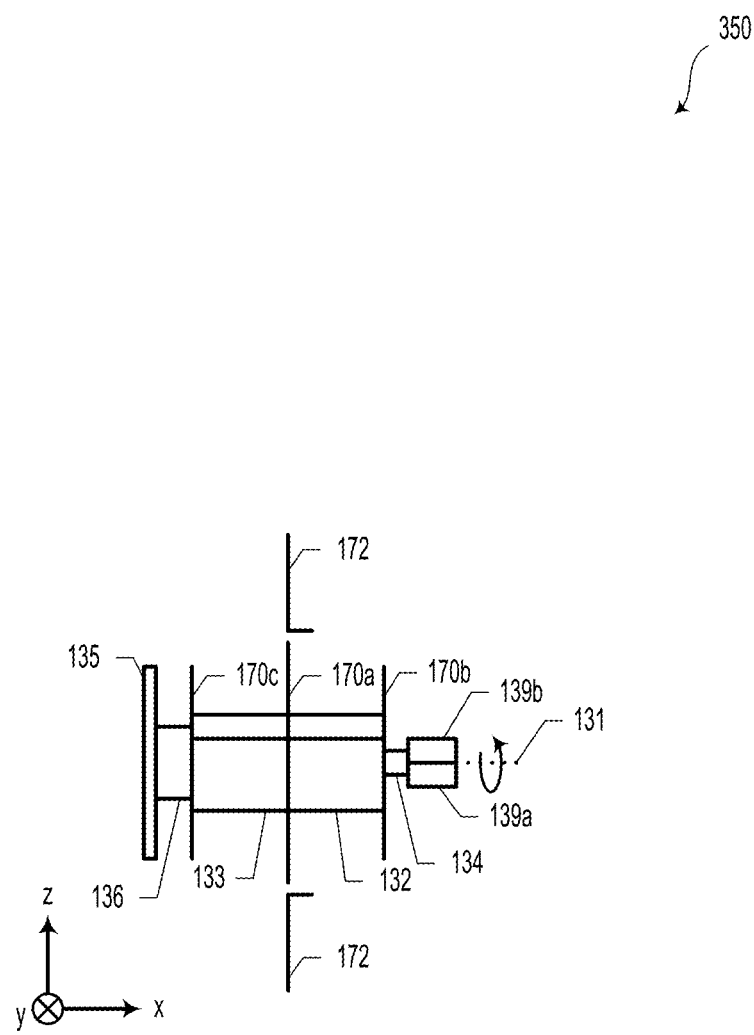
FIG. 3E illustrates a mirror assembly and baffle arrangement, according to an example embodiment.

FIG. 3E illustrates a cross-sectional view of a baffle arrangement 350 that includes an L-shaped static baffle 172 and a rotatable baffle 170*a*. In such an embodiment, the L-shaped static baffle 172 could provide a "lip" that may be configured to improve optical isolation between the transmitter and receiver portions of the optical cavity 120. For example, the L-shaped static baffle 172 could be shaped and/or sized so as to block stray light within the optical cavity 120.

Figure 3F:
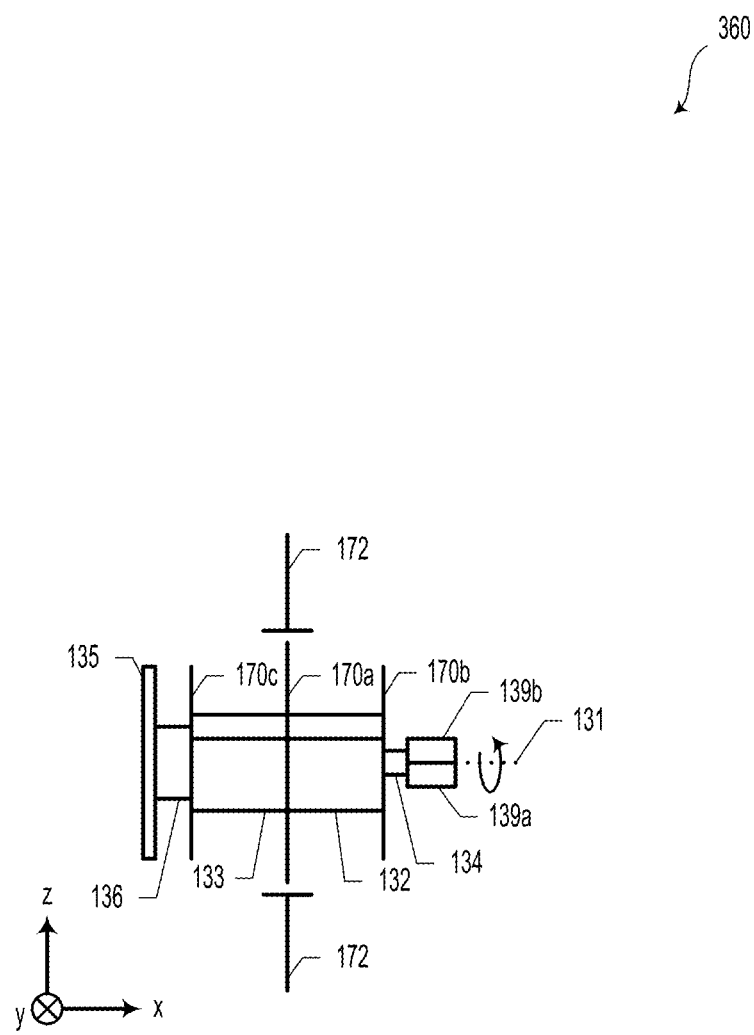
FIG. 3F illustrates a mirror assembly and baffle arrangement, according to an example embodiment.

FIG. 3F illustrates a cross-sectional view of a baffle arrangement 360 that includes a static baffle 172 with a T-shaped cross-section and a rotatable baffle 170*a*. In such an embodiment, the T-shaped static baffle 172 could provide a dual-edged "lip" that may improve optical isolation between the transmitter and receiver portions of the optical cavity 120. For example, the T-shaped static baffle 172 could be shaped and/or sized so as to block stray light within the optical cavity 120. In other words, the L-shaped and T-shaped static baffles 172 could reduce the internal reflections and/or light leakage within the optical cavity 120.

Figure 3G:
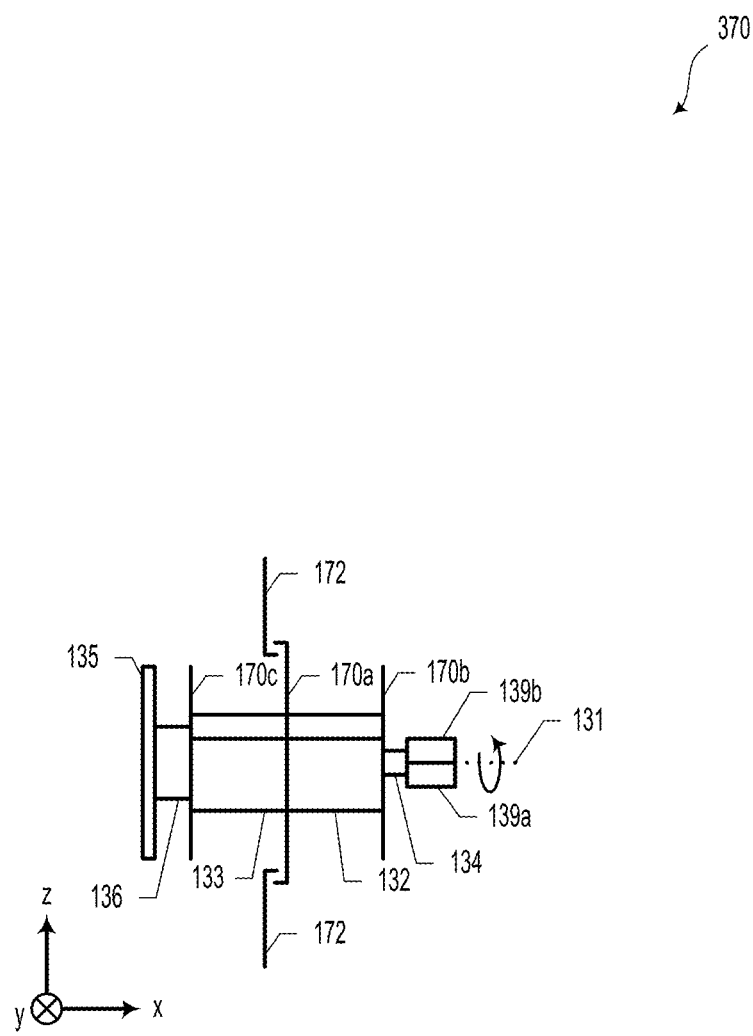
FIG. 3G illustrates a mirror assembly and baffle arrangement, according to an example embodiment.
Figure 3H:
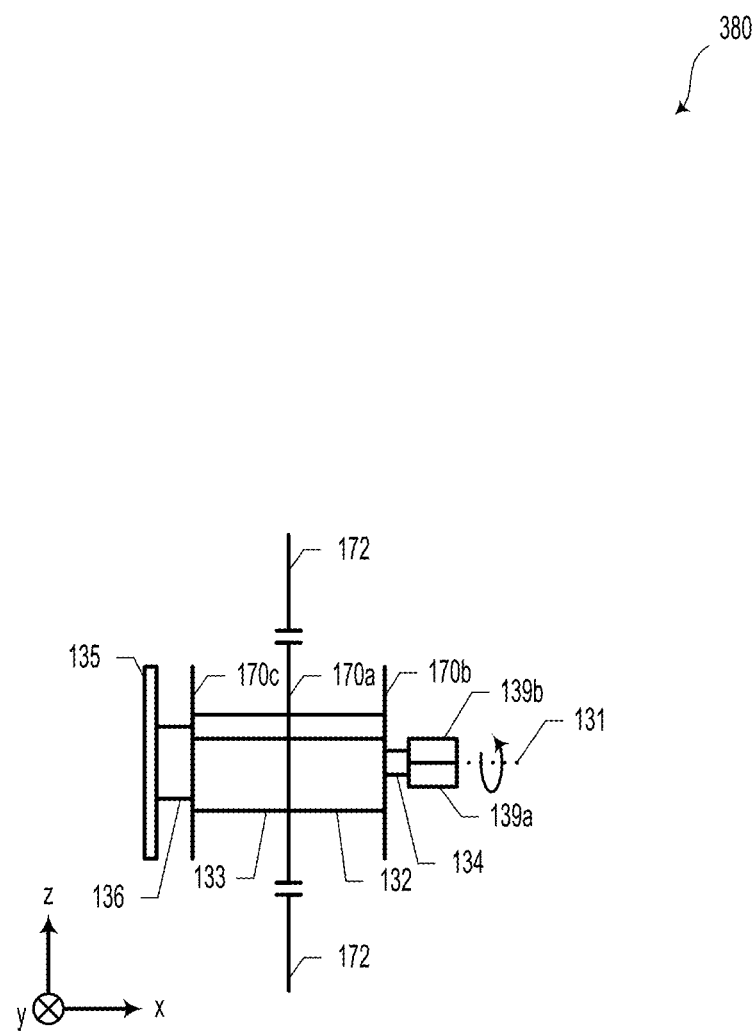
FIG. 3H illustrates a mirror assembly and baffle arrangement, according to an example embodiment.

In some embodiments, the respective baffle portions could be interleaved. Additionally or alternatively, the rotatable baffle portion could be provided in an L-shape or a T-shape. As illustrated in FIG. 3G, a baffle arrangement 370 could include an L-shaped static baffle 172 and an L-shaped rotatable baffle 170*a*. In such a scenario, the static baffle 172 and the rotatable baffle 170*a* could be interleaved. Yet further, as illustrated in FIG. 3H, a baffle arrangement 380 could include a T-shaped static baffle 172 and a T-shaped rotatable baffle 170*a*.

Whiles FIGS. 3C-3H illustrate certain baffle shapes, sizes, and arrangements, it will be understood that other baffle shapes, sizes, and arrangements are possible and contemplated. Furthermore, it will be understood that the static baffle 172 and the rotatable baffle 170*a* could be sized, shaped, and/or disposed with respect to one another so as to provide a desired level of optical isolation between the transmitter and receiver portions of the optical cavity 120.

Figure 4A:
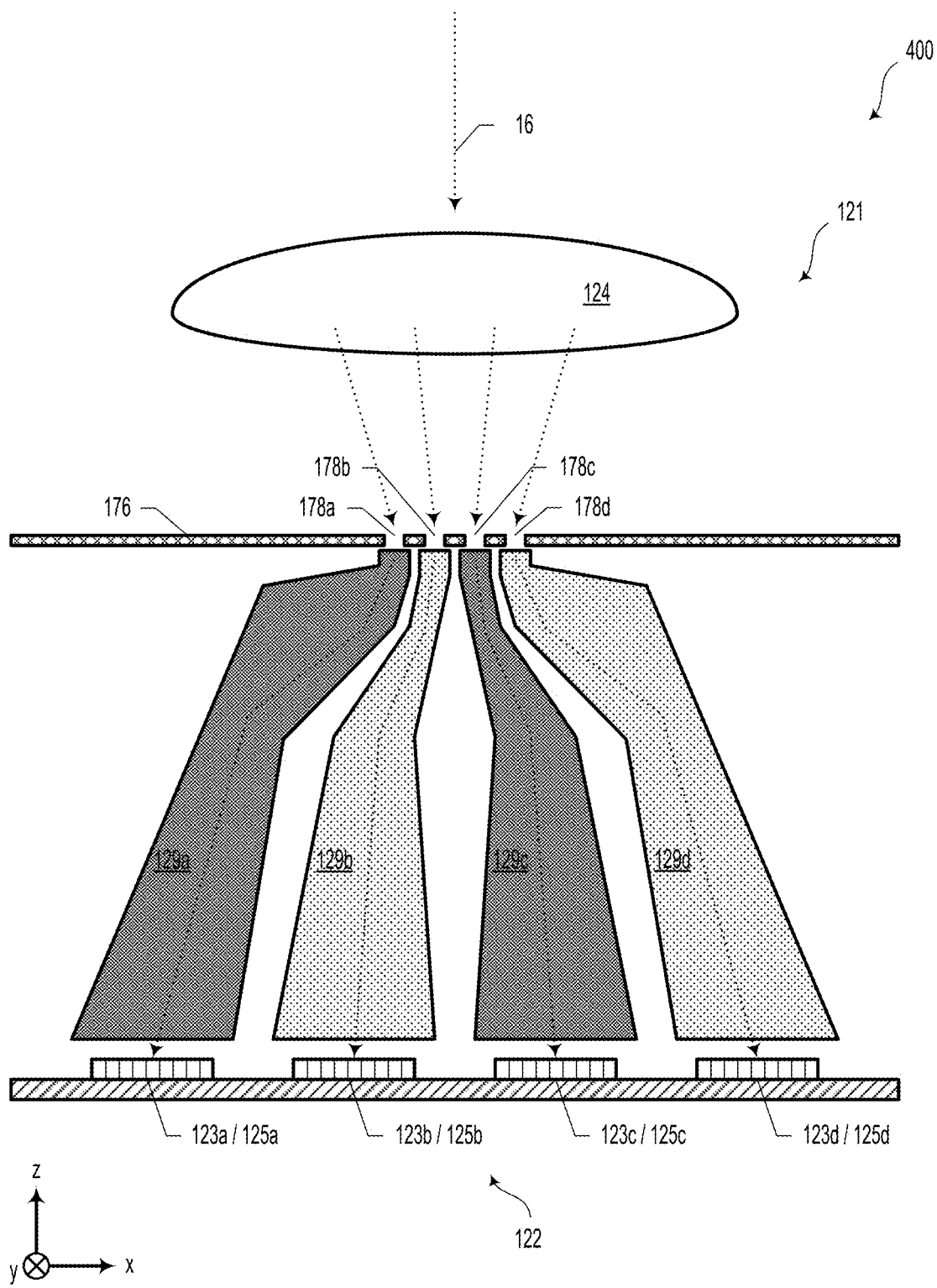
FIG. 4A illustrates a receiver, according to an example embodiment.

FIG. 4A illustrates a receiver 400, according to an example embodiment. Receiver 400 could be similar or identical to receiver 121, as illustrated and described in relation to FIG. 1. Receiver 400 could include an optical redirector device, which could be configured to receive return light 16 by way of photodetector lens 124. Receiver 400 could also include an aperture plate 176. The aperture plate 176 could include a plurality of apertures (e.g., apertures 178a, 178b, 178c, and 178d). In an example embodiment, at least one aperture of the plurality of apertures has a diameter between 150 microns and 300 microns. The plurality of apertures includes a set of openings formed in an aperture plate. In such scenarios, the aperture plate could have a thickness between 50 microns and 200 microns.

Receiver 400 includes a plurality of photodetectors 122 (e.g., primary light detectors 123a, 123b, 123c, and 123d and second light detectors 125a, 125b, 125c, and 125d).

Receiver 400 additionally includes a plurality of optical redirectors 129 (e.g., optical redirectors 129a, 129b, 129c, and 129d). Each optical redirector 129a, 129b, 129c, and 129d is configured to optically couple a respective portion of return light 16 from a respective aperture 178a, 178b, 178c, or 178d to at least one photodetector of the plurality of photodetectors.

In some embodiments, each optical redirector 129a, 129b, 129c, and 129d is configured to optically couple a respective portion of return light 16 from a respective aperture 178a, 178b, 178c, or 178d to at least one photodetector of the plurality of photodetectors 122 by total internal reflection.

In various embodiments, the optical redirectors 129 could be formed from an injection-moldable optical material. For example, the optical redirectors 129 could be formed from a polymeric thermoplastic optical material such as acrylic (polymethyl methacrylate or PMMA), polystyrene, polycarbonate, Cyclic Olefin Polymer (COP), Cyclic Olefin Copolymer (COC), or various copolymers, such as NAS, a copolymer of 70% polystyrene and 30% acrylic. Additionally or alternatively, some embodiments may include various polyaryletherketone (PAEK)-based materials, and/or polysulfonanones (PSU, PPSU, PES, etc) or polyetherimide (PEI). It will be understood that other optical materials are possible and contemplated.

The optical redirectors 129 could be coupled together in element pairs such that a first element pair and a second element pair are shaped to slidably couple with one another. For example, as illustrated in FIG. 4A, optical redirector 129a and optical redirector 129c could be physically coupled and could represent the first element pair. Similarly, optical redirector 129b and optical redirector 129d could be physically coupled and could represent the second element pair. As such, the first element pair and the second element pair could be configured to be assembled by sliding them together along the y-axis.

Figure 4B:
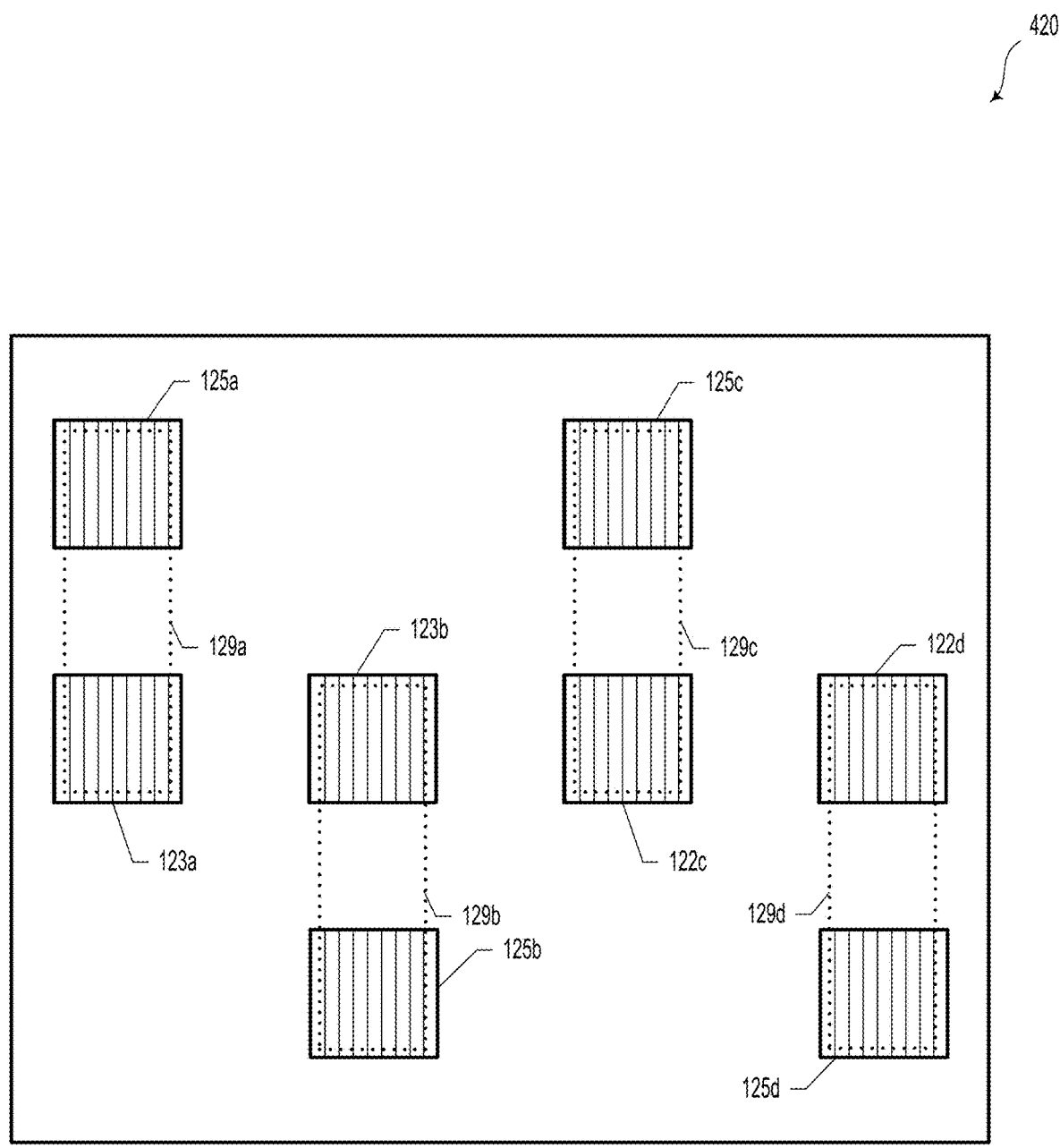
FIG. 4B illustrates an alternate view of the receiver of FIG. 4A, according to an example embodiment.

FIG. 4B illustrates an alternate view 420 of the receiver 400 of FIG. 4A, according to an example embodiment. As illustrated in FIG. 4B, the alternate view 420 could include a partial overhead view of the primary light detectors 123a, 123b, 123c, and 123d and the second light detectors 125a, 125b, 125c, and 125d. Furthermore, optical redirectors 129a, 129b, 129c, and 129d could each be optically coupled to a respective primary light detector and a corresponding secondary light detector.

While FIG. 4B illustrates a four-by-two array of light detectors (e.g., four primary light detectors in a first row and four secondary light detectors in a second row), it will be understood that other light detector geometries and layouts are possible and contemplated. For example, an alternative light detector layout could include a central row of four primary light detectors, an upper row of two secondary light detectors, and a lower row of two further secondary light detectors. Other arrangements are possible and contemplated.

Figure 4C:
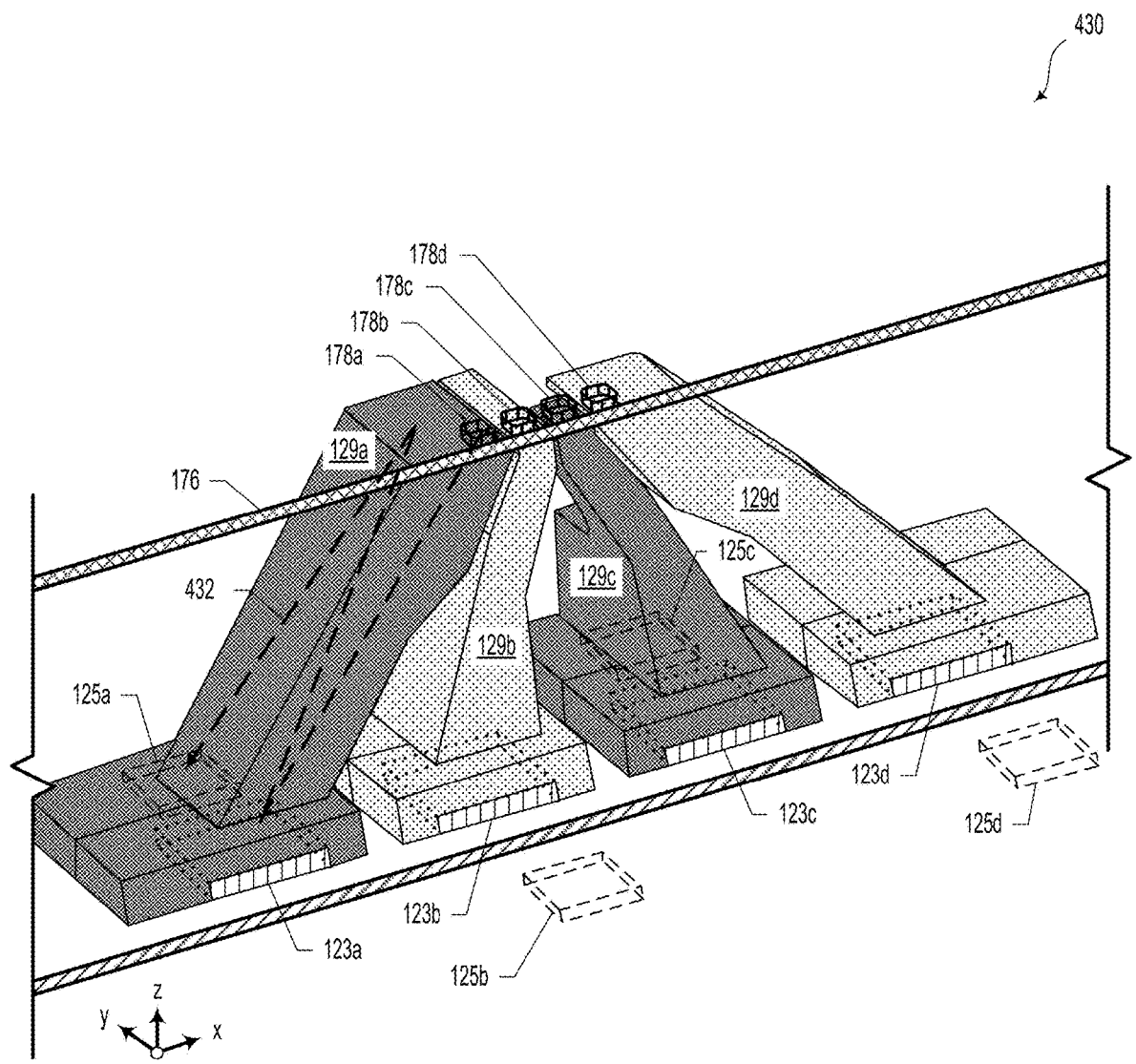
FIG. 4C illustrates an alternate view of the receiver of FIG. 4A, according to an example embodiment.
Figure 5A:
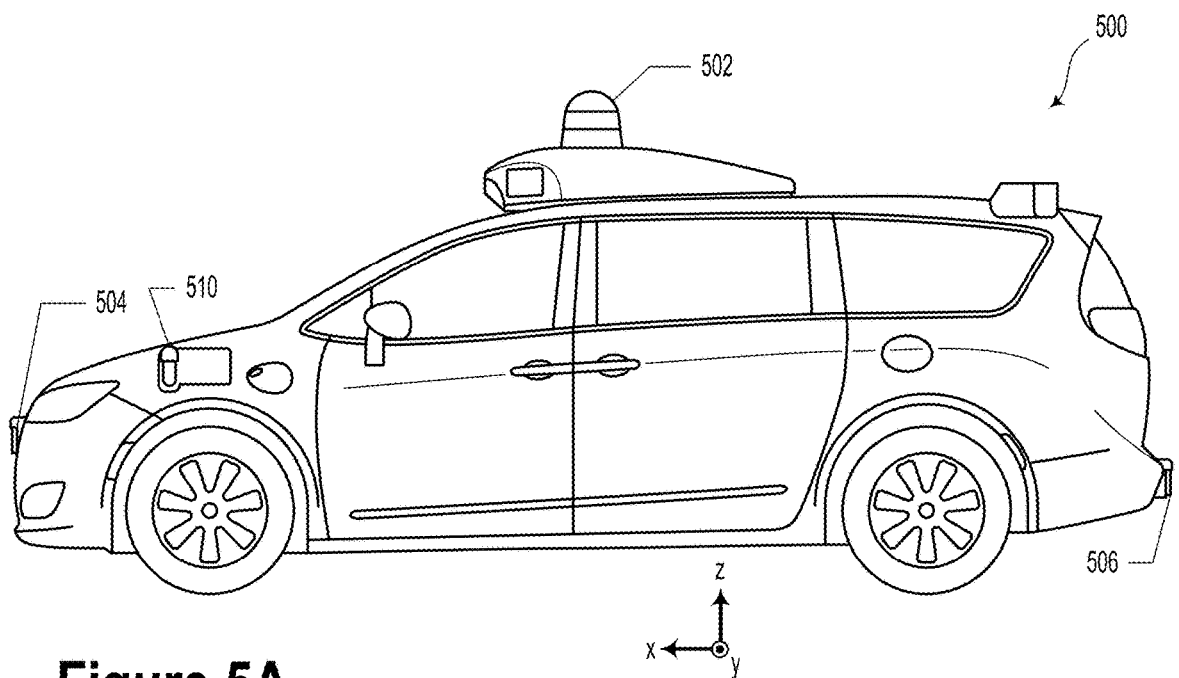
FIG. 5A illustrates a vehicle, according to an example embodiment.
Figure 5B:
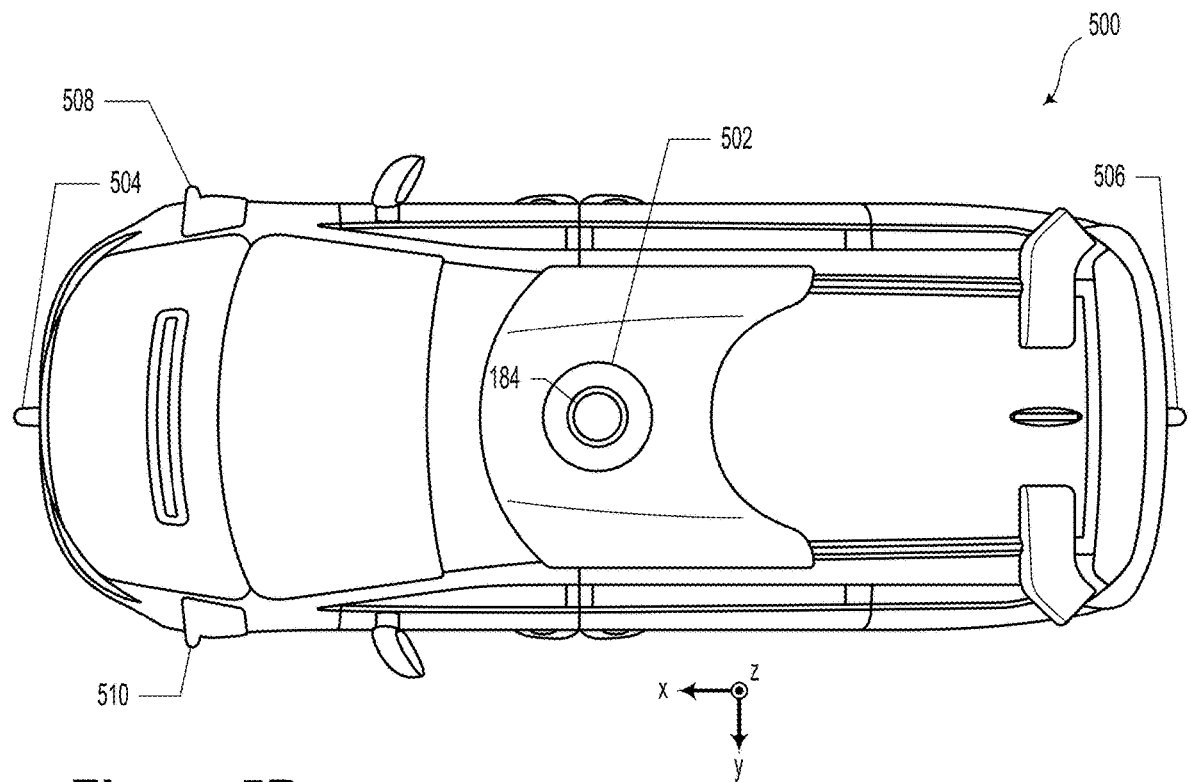
FIG. 5B illustrates a vehicle, according to an example embodiment.
Figure 5C:
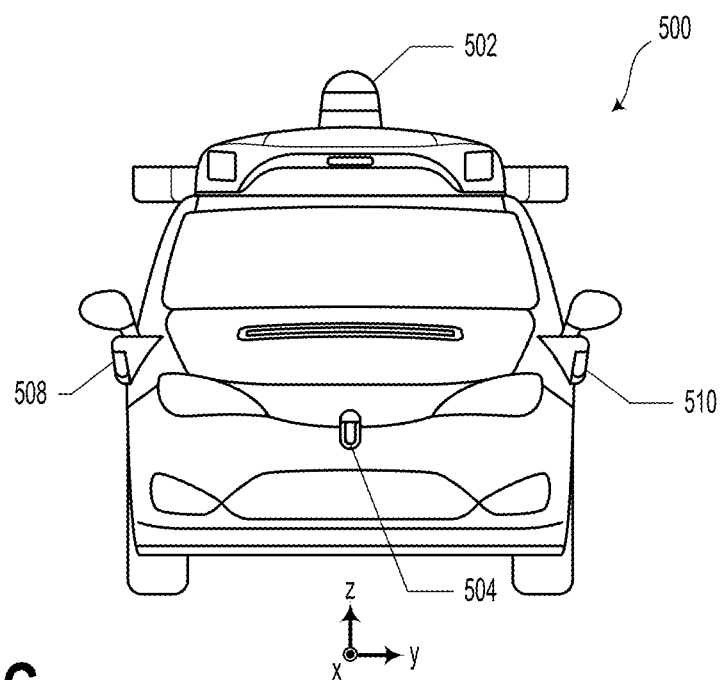
FIG. 5C illustrates a vehicle, according to an example embodiment.
Figure 5D:
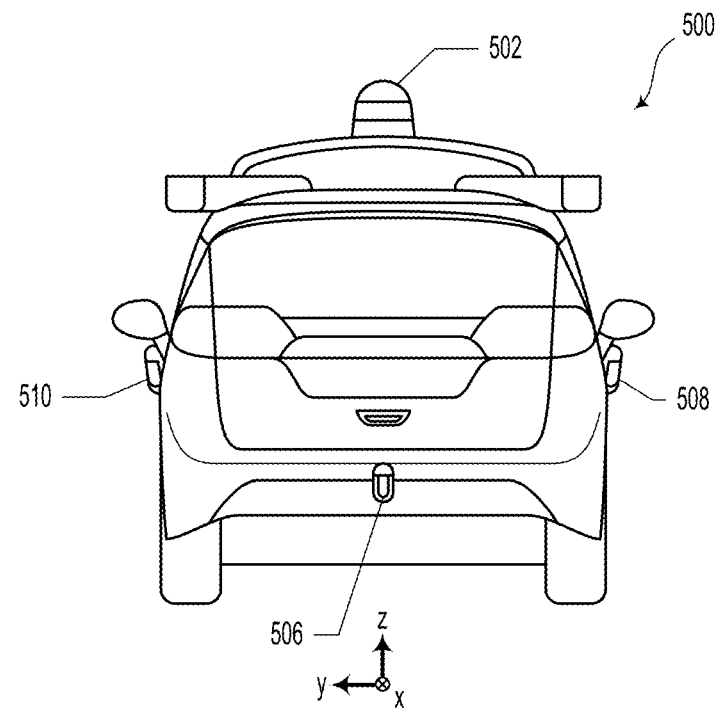
FIG. 5D illustrates a vehicle, according to an example embodiment.
Figure 5E:
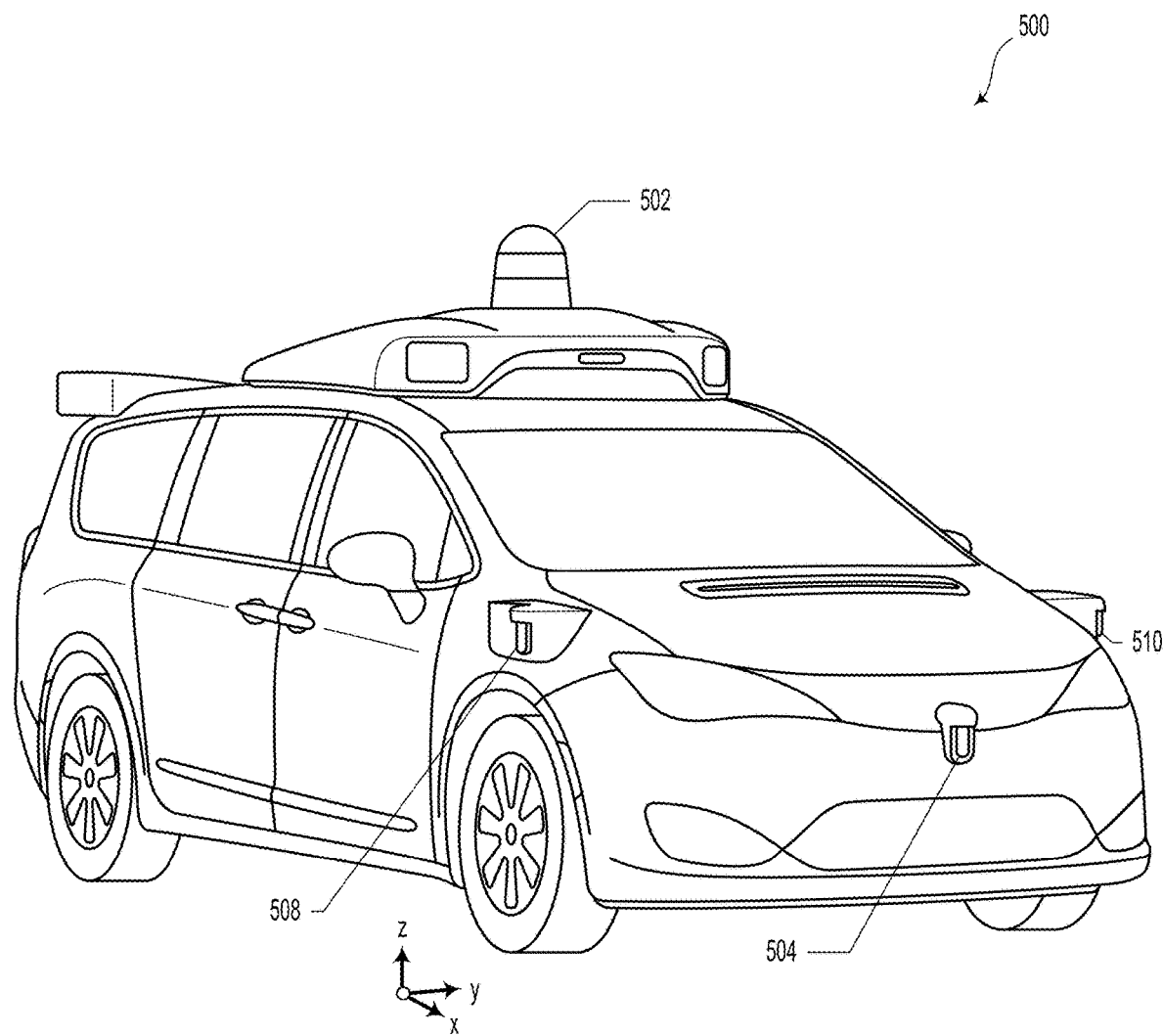
FIG. 5E illustrates a vehicle, according to an example embodiment.

FIG. 4C illustrates an alternate view 430 of the receiver 400 of FIG. 4A, according to an example embodiment. As illustrated in FIG. 4C, the alternate view 430 includes an oblique angle view of the receiver 400 and the optical redirectors 129a, 129b, 129c, and 129d. In some embodiments, incident light could enter through an aperture (e.g., aperture 178a) and interact with primary light detectors 123a. In some embodiments, a portion 432 of the incident light could be reflected from a top surface of the primary light detector 123a and subsequently reflected from a top surface of the optical redirector 129a so as to interact with the secondary light detector 125a. In various examples, it will be understood that various optical paths are contemplated and possible. For example, a portion of the incident light could be allowed to exit the redirector (e.g., via loss of total internal reflection), such a portion of the incident light could be provided to the secondary detector by way of an external feature, such as a reflective element.

While FIGS. 4A-4C illustrate an example embodiment, it will be understood that other optical redirector designs could be utilized so as to couple incident light between an input aperture and the photodetectors. For example, an example embodiment may include an optical redirector that substantially confines the light in a single optical plane (ignoring the divergence in the incoming beam). Additionally or alternatively, the optical redirector could be configured to direct light out-of-plane.

In some embodiments, the optical redirector could include a lensed surface. As an example, the lensed surface could be utilized on the input and/or output surface of the optical redirector. Such lensed surfaces could be beneficially configured to control the divergence of the optical beam and facilitate uniform optical coverage of the photodetector. Additionally or alternatively, at least one surface of the optical redirector could include a rippled surface, which may provide an engineered diffuser and an alternatively way to control optical beam divergence.

Yet further, it will be understood that one or more redirector channels could be incorporated or combined into a single optical redirector body. In such a scenario, each redirector channel could include an entrance aperture, an exit aperture, and one or more intermediate control surfaces. The redirector channel may be made of a solid, transparent material, or it may be hollow. Both the entrance and exit apertures, as well as some or all of the intermediate control surfaces may be configured to manipulate the incoming light via refraction, e.g. a prism with one or more facets, a lens in one or two directions, or an engineered diffusing pattern, or via reflection, e.g. a planar reflector with one or more facets, a curved reflector with optical power in one of two directions, or an engineered diffusing reflector. In various examples, optical reflectivity may be provided by the use of total internal reflection, or via the application of reflective coatings. In one embodiment, the redirector channel could be comprised of a solid transparent material, with entrance and exit apertures oriented to be nearly normal with the incoming light, and a pair of reflective facets disposed between the apertures. In a second embodiment, the redirector channel could be substantially similar to the first example, but the exit aperture is at a significant angle with respect to the exiting light, and one of the intermediate reflectors is formed of multiple facets which serve to compress the beam pattern in one direction, thereby offsetting the elongation of the beam pattern caused by the oblique intersection between the exit aperture and the beam. In a third embodiment, the redirector channel is comprised of a solid material, and consists only of an entrance aperture and an exit aperture, and the entrance aperture is inclined with respect to the incoming light so as to refract the incident light towards the exit aperture.

III. Example Vehicles

FIGS. 5A, 5B, 5C, 5D, and 5E illustrate a vehicle 500, according to an example embodiment. The vehicle 500 could be a semi- or fully-autonomous vehicle. While FIGS. 5A-5E illustrate vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include LIDAR sensors having a plurality of light-emitter devices arranged over a range of angles with respect to a given plane (e.g., the x-y plane).

One or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

An example embodiment may include a system having a plurality of light-emitter devices. The system may include a transmit block of a lidar device. For example, the system may correspond to (or may be included in) a lidar device of a vehicle (e.g., a car, a truck, a motorcycle, a golf cart, an aerial vehicle, a boat, etc.). Each light-emitter device of the plurality of light-emitter devices is configured to emit light pulses along a respective beam elevation angle. The respective beam elevation angles could be based on a reference angle or reference plane. In some embodiments, the reference plane may be based on an axis of motion of the vehicle 500.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. Embodiments utilizing a plurality of fixed beams are also contemplated within the context of the present disclosure.

In some embodiments, a single light-emitter device may emit light pulses according to a variable shot schedule and/or with variable power per shot, as described herein. That is, emission power and/or timing of each laser pulse or shot may be based on a respective elevation angle of the shot. Furthermore, the variable shot schedule could be based on providing a desired vertical spacing at a given distance from the lidar system or from a surface (e.g., a front bumper) of a given vehicle supporting the lidar system. As an example, when the light pulses from the light-emitter device are directed downwards, the power-per-shot could be decreased due to a shorter anticipated maximum distance to target. Conversely, light pulses emitted by the light-emitter device at an elevation angle above a reference plane may have a relatively higher power-per-shot so as to provide sufficient signal-to-noise to adequately detect pulses that travel longer distances.

In some embodiments, the power/energy-per-shot could be controlled for each shot in a dynamic fashion. In other embodiments, the power/energy-per-shot could be controlled for successive set of several pulses (e.g., 10 light pulses). That is, the characteristics of the light pulse train could be changed on a per-pulse basis and/or a per-several-pulse basis.

While FIGS. 5A-5E illustrates various lidar sensors attached to the vehicle 500, it will be understood that the vehicle 500 could incorporate other types of sensors, such as a plurality of optical systems (e.g., cameras), radars, or ultrasonic sensors.

In an example embodiment, vehicle 500 could include a lidar system (e.g., system 100) configured to emit light pulses into an environment of the vehicle 500 so as to provide information indicative of objects within a default field of view. For example, vehicle 500 could include an optical system (e.g., system 100) having a rotatable base (e.g., rotatable base 110) configured to rotate about a first axis (e.g., first axis 102). The optical system could also include a mirror assembly (e.g., mirror assembly 130). The mirror assembly could be configured to rotate about a mirror rotation axis (e.g., mirror rotation axis 131). In some embodiments, the mirror rotation axis is substantially perpendicular to the first axis.

The optical system also includes an optical cavity (e.g., optical cavity 120) coupled to the rotatable base. In such scenarios, the optical cavity includes at least one light-emitter device (e.g., light-emitter device 126) and a light-emitter lens (e.g., light-emitter lens 128). The at least one light-emitter device and the light-emitter lens are arranged so as to define a light-emission axis (e.g., light-emission axis 18).

The optical system additionally includes a plurality of photodetectors (e.g., photodetectors 122. In an example embodiment, the plurality of photodetectors includes a respective set of two or more photodetectors for each light-emitter device of the at least one light-emitter device. The optical system also includes a photodetector lens (e.g., photodetector lens 124. In such scenarios, the plurality of photodetectors and the photodetector lens are arranged so as to define a light-receiving axis (e.g., light-receiving axis 19).

In some embodiments, each set of two or more photodetectors could include a primary light detector (e.g., primary light detector 123) and a secondary light detector (e.g., secondary light detector 125). In such scenarios, the primary light detector is configured to receive a first portion of return light emitted from a given light-emitter device. Furthermore, the secondary light detector is configured to receive a second portion of return light emitted from the given light-emitter device.

In some embodiments, the first portion of the return light is at least an order of magnitude greater in photon flux than the second portion of the return light.

IV. Example Methods

Figure 6:
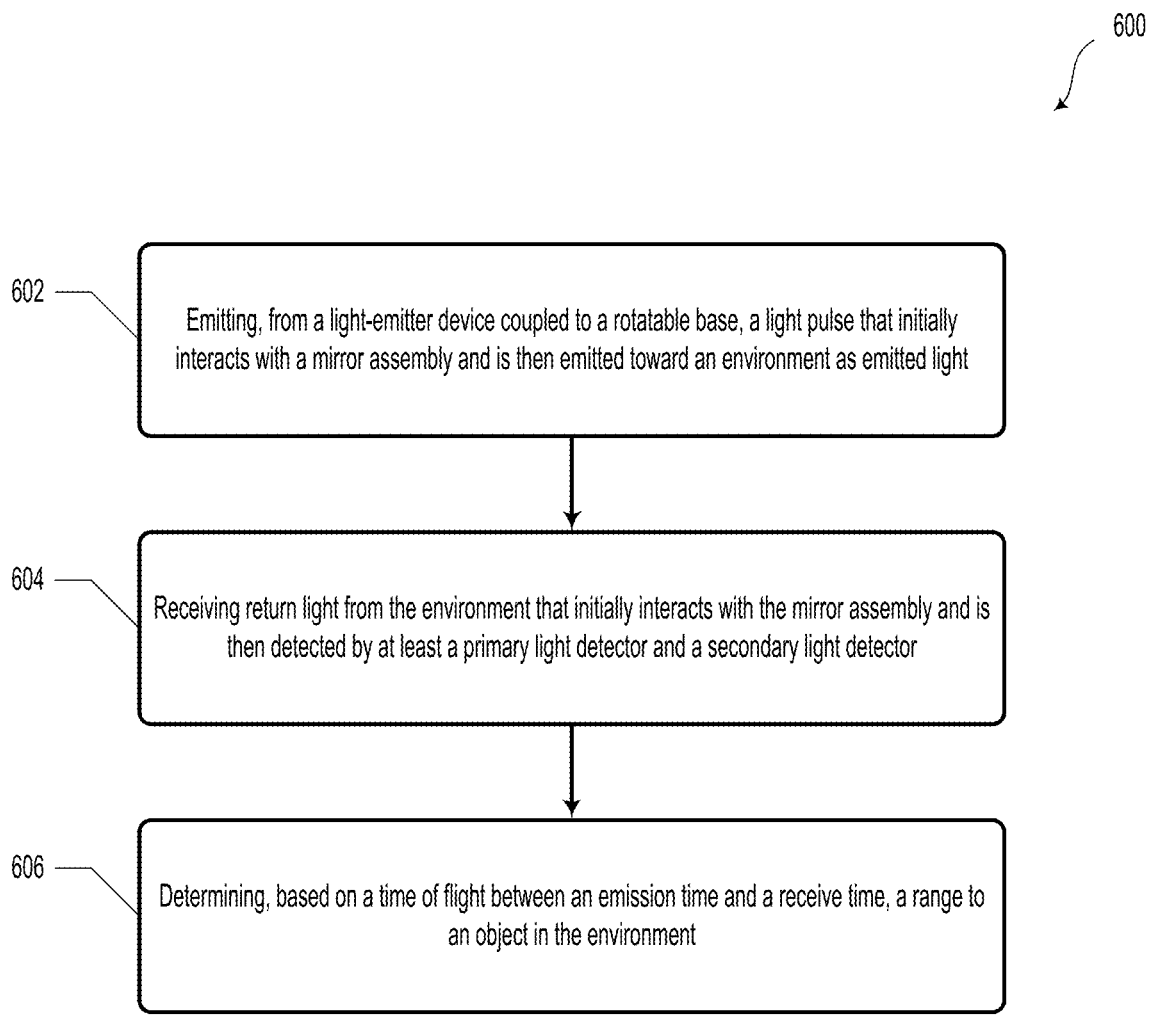
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150 and/or other elements of system 100, 200, 220, or 230 as illustrated and described in relation to FIGS. 1, 2A, 2B, and 2C, respectively.

Block 602 includes emitting, from a light-emitter device coupled to a rotatable base, a light pulse that initially interacts with a mirror assembly and is then emitted toward an environment as emitted light Block 604 includes receiving return light from the environment that initially interacts with the mirror assembly and is then detected by at least a primary light detector and a secondary light detector.

Block 606 includes determining, based on a time of flight between an emission time and a receive time, a range to an object in the environment.

In some embodiments, method 600 may additionally include causing the rotatable base to rotate about a first axis, causing the mirror assembly to rotate about a mirror rotation axis, and, while the mirror assembly is rotating, repeating the emitting, receiving, and determining steps so as to form a point cloud. The point cloud includes a plurality of ranges or range data within a three-dimensional representation of the environment.

Figure 7:
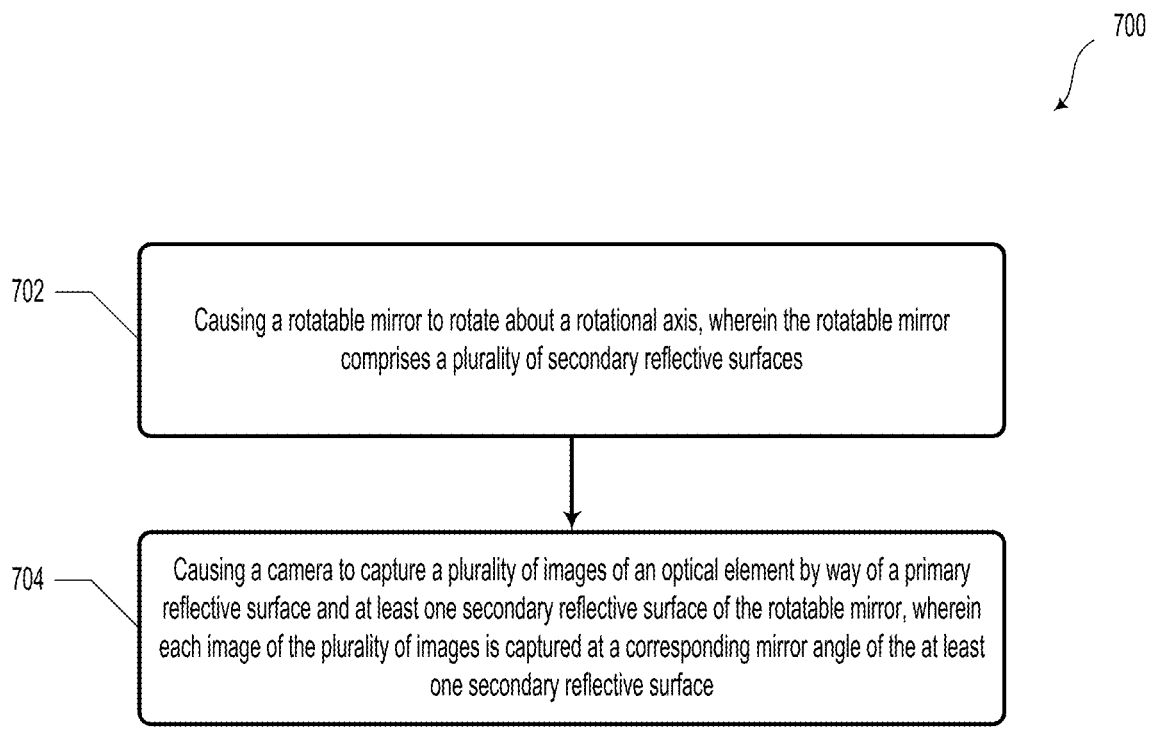
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may be carried out by controller 150 and/or other elements of system 100, 200, 220, or 230 as illustrated and described in relation to FIGS. 1, 2A, 2B, and 2C, respectively.

Block 702 includes causing a rotatable mirror (e.g., mirror body 133) to rotate about a rotational axis (e.g., mirror rotation axis 131). In such scenarios, the rotatable mirror could include a plurality of secondary reflective surfaces (e.g., reflective surfaces 132).

Block 704 includes causing a camera (e.g., camera 166) to capture a plurality of images of an optical element (e.g., optical window 162) by way of a primary reflective surface (e.g., primary reflective surface 163) and at least one secondary reflective surface of the rotatable mirror. Each image of the plurality of images is captured at a corresponding mirror angle of the at least one secondary reflective surface.

In some embodiments, method 700 could additionally include determining an aggregate image of the optical element based on the plurality of images and the corresponding mirror angles of the at least one secondary reflective surface.

In such scenarios, method 700 could include determining, based on the aggregate image, that at least one occlusion object is present on the optical element.

Method 700 could additionally include, while causing the camera to capture the plurality of images, causing an illuminator (e.g., illuminator 161) to emit light to illuminate the optical element by way of the primary reflective surface and the rotatable mirror.

Figure 8:
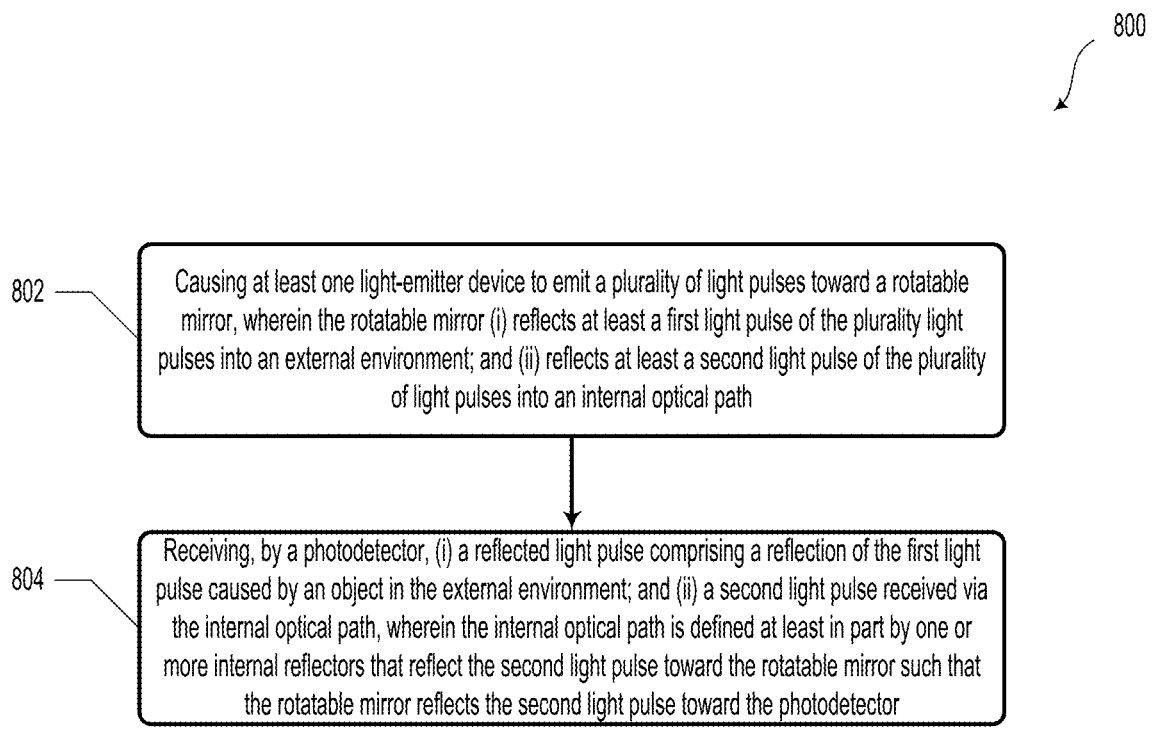
FIG. 8 illustrates a method, according to an example embodiment.

FIG. 8 illustrates a method 800, according to an example embodiment. It will be understood that the method 800 may include fewer or more steps or blocks than those expressly illustrated or otherwise disclosed herein. Furthermore, respective steps or blocks of method 800 may be performed in any order and each step or block may be performed one or more times. In some embodiments, some or all of the blocks or steps of method 800 may be carried out by controller 150 and/or other elements of system 100, 200, 220, or 230 as illustrated and described in relation to FIGS. 1, 2A, 2B, and 2C, respectively.

Block 802 includes causing at least one light-emitter device (e.g., light-emitter device 126) to emit a plurality of light pulses toward a rotatable mirror (e.g., mirror assembly 130). The rotatable mirror (i) reflects at least a first light pulse of the plurality light pulses into an external environment (e.g., environment 10); and (ii) reflects at least a second light pulse of the plurality of light pulses into an internal optical path (e.g., internal optical path 168).

Block 804 includes receiving, by a photodetector (e.g., photodetectors 122), (i) a reflected light pulse that includes a reflection of the first light pulse caused by an object (e.g., object 12) in the external environment (e.g., environment 10); and (ii) a second light pulse received via the internal optical path. The internal optical path is defined at least in part by one or more internal reflectors (e.g., internal reflector 180) that reflect the second light pulse toward the rotatable mirror such that the rotatable mirror reflects the second light pulse toward the photodetector.

Additionally or alternatively, method 800 could include determining a distance to the object in the external environment based on a time when the first light pulse is emitted by the light-emitter device, a time when the first light pulse is detected by the photodetector, a time when the second pulse was emitted, and a time when the second light pulse is detected by the photodetector.

Figure 9:
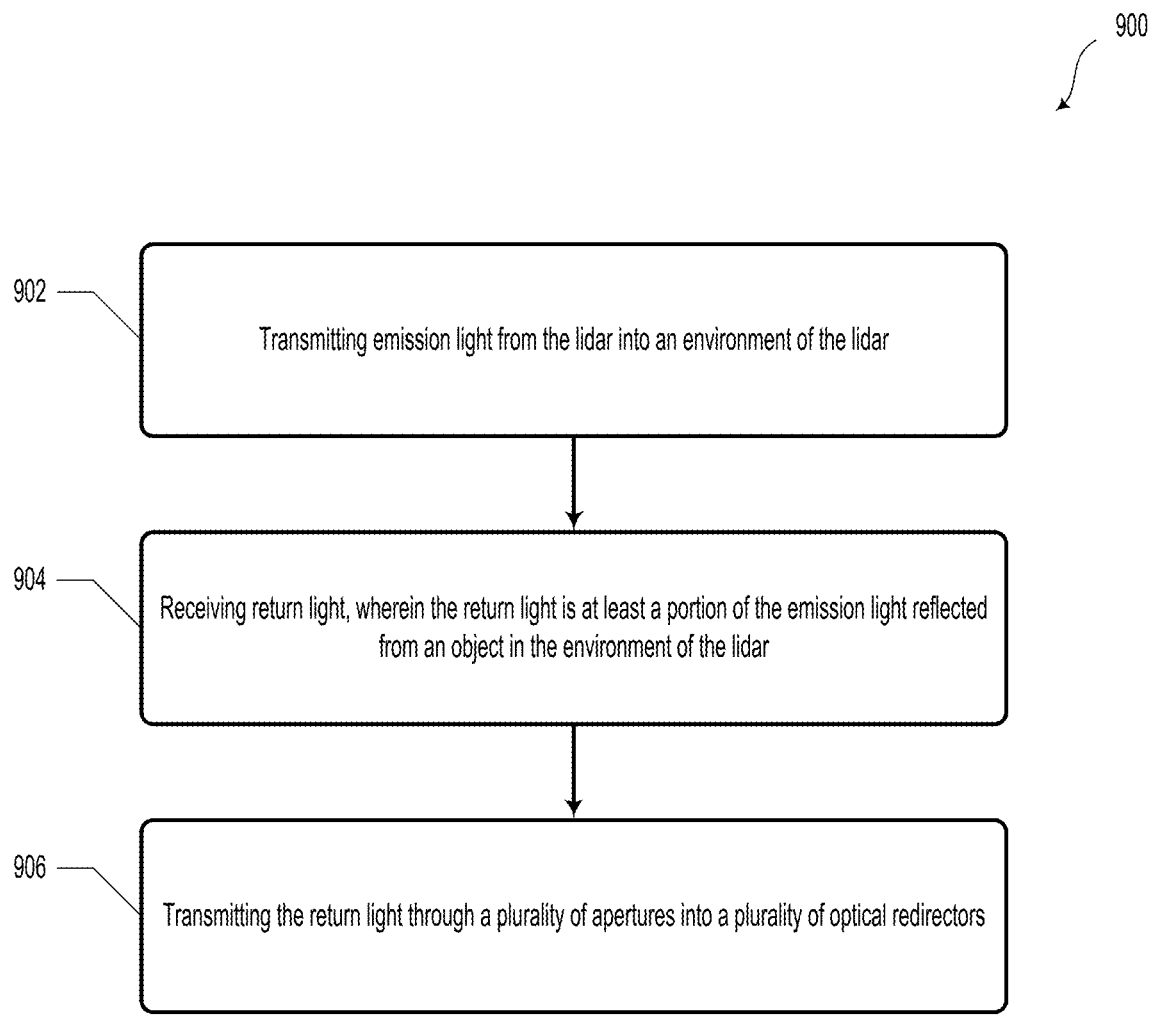
FIG. 9 illustrates a method, according to an example embodiment.

FIG. 9 illustrates a method 900, according to an example embodiment. It will be understood that the method 900 may include fewer or more steps or blocks than those expressly illustrated or otherwise disclosed herein. Furthermore, respective steps or blocks of method 900 may be performed in any order and each step or block may be performed one or more times. In some embodiments, some or all of the blocks or steps of method 900 may be carried out by controller 150 and/or other elements of system 100, 200, 220, or 230 as illustrated and described in relation to FIGS. 1, 2A, 2B, and 2C, respectively.

Method 900 may be for enhancing a dynamic range of a light detection and ranging (lidar) system. Block 902 could include transmitting emission light (e.g., transmit light 14) from the lidar (e.g., system 100) into an environment of the lidar (e.g., environment 10).

Block 904 may include receiving return light (e.g., return light 16). The return light is at least a portion of the emission light reflected from an object (e.g., object 12) in the environment of the lidar.

Block 906 includes transmitting the return light through a plurality of apertures (e.g., apertures 178) into a plurality of optical redirectors (e.g., optical redirectors 129).

The arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A light detection and ranging (lidar) device, comprising:
    a housing;
    a mirror assembly disposed within the housing, wherein the mirror assembly comprises:
        a shaft, wherein the shaft defines a rotational axis of the mirror assembly;
        a plurality of reflective surfaces arranged about the rotational axis, wherein each reflective surface is defined by a reflective material; and
        a rotatable baffle that defines a transmit side of the reflective surfaces and a receive side of the reflective surfaces;
    a motor comprising a stator configured to rotate the mirror assembly about the rotational axis;
    a transmitter configured to emit emission light into an environment of the lidar device via the transmit side of the reflective surfaces of the mirror assembly;
    a receiver configured to detect return light that is received from the environment via the receive side of the reflective surfaces of the mirror assembly; and
    a static baffle coupled to the housing, wherein an arrangement of the static baffle and the rotatable baffle is configured to reduce light leakage between the transmitter and the receiver, and wherein a cross-section of an edge of the static baffle that is proximate to the rotatable baffle has an L-shape or a T-shape.

2. The lidar device of claim 1, further comprising an encoder magnet disposed proximate to an end of the shaft, wherein the encoder magnet is configured to provide information indicative of a rotational position of the mirror assembly with respect to the transmitter and the receiver.

3. The lidar device of claim 1, further comprising a plastic material disposed on at least a portion of the shaft, wherein the plastic material comprises an inner portion disposed on the shaft, an outer portion on which the reflective material is disposed, a space between the inner portion and outer portion, and a plurality of couplings extending between the inner portion and the outer portion.

4. The lidar device of claim 3, wherein each coupling of the plurality of couplings comprises a radial member and a cross-bar member, wherein the cross-bar member extends between a first side of the outer portion and a second side of the outer portion, wherein the radial member extends between the inner portion and the cross-bar member, wherein the first side of the outer portion supports a first reflective surface, and wherein the second side of the outer portion supports a second reflective surface.

5. The lidar device of claim 4, wherein the plurality of reflective surfaces comprises four reflective surfaces, wherein a shape of the outer portion of the plastic material comprises a rectangular prism.

6. The lidar device of claim 1, wherein the shaft comprises a metal, and wherein the plurality of couplings are flexible in a direction perpendicular to the rotational axis, such that the plurality of couplings accommodate for a thermal expansion difference between the metal and a plastic material disposed on the shaft.

7. The lidar device of claim 1, wherein the mirror assembly further comprises a bearing having an inner race and an outer race, wherein the inner race is coupled to the shaft proximate to an end of the shaft, and wherein the lidar device further comprises:
    a coupling bracket coupled to the outer race of the bearing, wherein the coupling bracket is removably mounted to the housing.

8. The lidar device of claim 1, wherein the cross-section of the edge of the static baffle that is proximate to the rotatable baffle has an L-shape.

9. The lidar device of claim 1, wherein the cross-section of the edge of the static baffle that is proximate to the rotatable baffle has a T-shape.

10. The lidar device of claim 9, wherein a cross-section of an edge of the rotatable baffle has a T-shape.

11. The lidar device of claim 1, wherein the static baffle includes an opening, and wherein the lidar device further comprises:
    at least two internal reflectors configured to direct a portion of the emission light from the transmitter to the receiver via the opening in the static baffle.

12. A light detection and ranging (lidar) device, comprising:
    a housing;
    a mirror assembly disposed within the housing, wherein the mirror assembly comprises:

a shaft, wherein the shaft defines a rotational axis of the mirror assembly;
a plurality of reflective surfaces arranged about the rotational axis, wherein each reflective surface is defined by a reflective material; and
a rotatable baffle that defines a transmit side of the reflective surfaces and a receive side of the reflective surfaces;
a motor comprising a stator configured to rotate the mirror assembly about the rotational axis;
a transmitter configured to emit emission light into an environment of the lidar device via the transmit side of the reflective surfaces of the mirror assembly;
a receiver configured to detect return light that is received from the environment via the receive side of the reflective surfaces of the mirror assembly; and
a static baffle coupled to the housing, wherein an arrangement of the static baffle and the rotatable baffle is configured to reduce light leakage between the transmitter and the receiver, and wherein the static baffle and the rotatable baffle overlap in a direction perpendicular to the rotational axis.

13. The lidar device of claim 12, further comprising an encoder magnet disposed proximate to an end of the shaft, wherein the encoder magnet is configured to provide information indicative of a rotational position of the mirror assembly with respect to the transmitter and the receiver.

14. The lidar device of claim 12, further comprising a plastic material disposed on at least a portion of the shaft, wherein the plastic material comprises an inner portion disposed on the shaft, an outer portion on which the reflective material is disposed, a space between the inner portion and outer portion, and a plurality of couplings extending between the inner portion and the outer portion.

15. The lidar device of claim 14, wherein each coupling of the plurality of couplings comprises a radial member and a cross-bar member, wherein the cross-bar member extends between a first side of the outer portion and a second side of the outer portion, wherein the radial member extends between the inner portion and the cross-bar member, wherein the first side of the outer portion supports a first reflective surface, and wherein the second side of the outer portion supports a second reflective surface.

16. The lidar device of claim 15, wherein the plurality of reflective surfaces comprises four reflective surfaces, wherein a shape of the outer portion of the plastic material comprises a rectangular prism.

17. The lidar device of claim 12, wherein the shaft comprises a metal, and wherein the plurality of couplings are flexible in a direction perpendicular to the rotational axis, such that the plurality of couplings accommodate for a thermal expansion difference between the metal and a plastic material disposed on the shaft.

18. The lidar device of claim 12, wherein the mirror assembly further comprises a bearing having an inner race and an outer race, wherein the inner race is coupled to the shaft proximate to an end of the shaft, and wherein the lidar device further comprises:
a coupling bracket coupled to the outer race of the bearing, wherein the coupling bracket is removably mounted to the housing.

19. The lidar device of claim 12, wherein a cross-section of an edge of the rotatable baffle has an L-shape, wherein a cross-section of an edge of the static baffle has an L-shape, and wherein the L-shaped edges of the rotatable baffle and static baffle are interleaved.

20. The lidar device of claim 12, wherein the static baffle includes an opening, and wherein the lidar device further comprises:
at least two internal reflectors configured to direct a portion of the emission light from the transmitter to the receiver via the opening in the static baffle.

* * * * *